(12) United States Patent
Knight et al.

(10) Patent No.: US 7,499,766 B2
(45) Date of Patent: Mar. 3, 2009

(54) ASSOCIATED SYSTEMS AND METHODS FOR IMPROVING PLANNING, SCHEDULING, AND SUPPLY CHAIN MANAGEMENT

(75) Inventors: Thomas Knight, Duluth, GA (US); Donald Rosenfield, Lexington, MA (US); Steven Graves, Westwood, MA (US); Otis B. Jennings, Durham, NC (US); John Bishop, Norcross, GA (US); Sichong Guan, Alpharetta, GA (US); Brian Sulka, Duluth, GA (US); Leon McGinnis, Dunwoody, GA (US); Patrick McDonnell, Duluth, GA (US)

(73) Assignee: Invistics Corporation, Norcross, GA (US)

( * ) Notice: Subject to any disclaimer, the term of this patent is extended or adjusted under 35 U.S.C. 154(b) by 143 days.

(21) Appl. No.: 11/368,866

(22) Filed: Mar. 6, 2006

(65) Prior Publication Data

US 2006/0235557 A1    Oct. 19, 2006

Related U.S. Application Data

(63) Continuation-in-part of application No. 10/685,670, filed on Oct. 14, 2003, now abandoned.

(60) Provisional application No. 60/658,717, filed on Mar. 4, 2005, provisional application No. 60/418,399, filed on Oct. 11, 2002.

(51) Int. Cl.
*G06F 19/00* (2006.01)

(52) U.S. Cl. ........................................ 700/107; 700/97

(58) Field of Classification Search ........... 700/99–101, 700/97, 106–107; 705/10, 22, 16, 400; 707/401.1
See application file for complete search history.

(56) References Cited

U.S. PATENT DOCUMENTS

| 5,291,397 A | 3/1994 | Powell |
| 5,369,570 A | 11/1994 | Parad |
| 5,596,502 A | 1/1997 | Koski et al. |

(Continued)

FOREIGN PATENT DOCUMENTS

WO    WO01/73651 A2    10/2001

(Continued)

OTHER PUBLICATIONS

Letter from Richard S. Meyer to Scott Geller and Joseph G. Silver, Esq. dated May 29, 2007, regarding prior art disclosures with attachments citing prior art references and SBIR proposal SBIR/STTR Phase II proposal.

(Continued)

*Primary Examiner*—Kidest Bahta
(74) *Attorney, Agent, or Firm*—DLA Piper LLP US

(57) ABSTRACT

The invention relates to systems and methods for improving planning, scheduling, and supply chain management. Embodiments of the invention can provide some or all of the following: improved systems and methods for determining an optimal lot size, improved systems and methods for determining optimal WIP levels, improved systems and methods for an inventory advisor module, improved systems and methods for integrating functionality of a lot sizer and WIP module and an inventory module, improved systems and methods for implementing multi-echelon inventory analysis, and improved systems and methods for partitioning planning information.

4 Claims, 26 Drawing Sheets

U.S. PATENT DOCUMENTS

| | | | |
|---|---|---|---|
| 5,630,070 A | | 5/1997 | Dietrich et al. |
| 5,774,661 A | * | 6/1998 | Chatterjee et al. ............ 709/203 |
| 5,963,919 A | | 10/1999 | Brinkley et al. |
| 6,061,691 A | | 5/2000 | Fox |
| 6,078,901 A | | 6/2000 | Ching |
| 6,415,195 B1 | | 7/2002 | Gleditsch et al. |
| 2003/0097317 A1 | | 5/2003 | Burk et al. |
| 2005/0075949 A1 | * | 4/2005 | Uhrig et al. .................... 705/28 |
| 2005/0177425 A1 | * | 8/2005 | Sziklai ......................... 705/14 |
| 2007/0271181 A1 | * | 11/2007 | Springer ....................... 705/39 |

FOREIGN PATENT DOCUMENTS

WO          WO02/29608 A2    4/2002

OTHER PUBLICATIONS

Allen, C., "The Impact of Network Topology on Rational Function Models of the Cycle-time Throughput Curve", Honors Thesis, Department of Industrial Engineering, Northwestern University, 2003.

Asbjoern M., Bonvik, Yves Dallery, and Stanley B. Gershwin, "Approximate analysis of production systems operated by a CONWIP/finite buffer hybrid control policy," International Journal of Production Research, vol. 38, No. 13, pp. 2845-2869.

Bitran, G., and Tirupati, D., "Tradeoff Curves, Targeting and Balancing in Manufacturing Queuing Network", Operations Research, 37:4, (1989), 547-564.

Domaschke, J., Robinson, J., Leibl, F., "Effective Implementation of Cycle Time Reduction Strategies for Semi Conductor Back End Manufacturing", Proceedings of the 1998 Winter Simulation Conference, 985-1010.

Enns, S., and Choi, S., Use of GI/G/1 Queuing Approximations to Set Tactical Parameters for the Simulations of MRP Systems, Proceedings of the 2002 Winter Simulation Conference, 1123-1129.

Framian, J., Ruiz-Usano, R., and Leisten R., "Sequencing CONWIP flow-shops: analysis and Heuristics", International Journal of Production Research.

Grewal, N., Bruskam A., Wulf, T., and Robinson J., "Integrating Targeted Cycletime Reduction into the Capital Planning Process", Proceedings of the 1998 Winter Simulation Conference, 1005-1008.

GR Bitran and R. Morabito, "An Overview Tradeoff Curves in Manufacturing Systems Design," Production & Operations Management, vol. 8, No. 1, 56-75, 1999.

Homem-de-Mello, T., Shapiro, A., and Spearman, M., "Finding Optimal Material release Times Using Simulation based Optimization", Management Science, 45:1(1999), 86-102.

Hopp, W., and Roof, M., "Setting WIP levels with Statistical Throughput Control in CONWIP Production Lines", International Journal of Production Research, 36:4(1998), 867-882.

Hopp, W., Spearman, M., Chayet, S., Donohoe, K., and Gel, E., "Using an Optimized Queuing Network Model to Support Wafer Fab Design", IIE Transactions, 34:2,(2002), 119-130.

WJ Hopp, ML Spearman, "Factory Physics: Foundations of Manufacturing Management," pp. 213-243 and 248-283. New York: McGraw Hill, 1997.

Johnson, R., Yang, F., Ankenman, B., and N. Nelson, "Nonlinear Regression Fits for Simulated Cycle Time Vs Throughput Curves for Semiconductor Manufacturing", Proceedings of the 2004 Winter Simulation Conference.

Kuik, R., and P.F.J. Tielemans, "Analysis of Expected Queueing Delays for Decision Making in Production Planning," European Journal of Operational Research 110 (19980, 658-681.

Louw, L. and Page, D.C. "Queueing network analysis approach for estimating the sizes of the time buffers in Theory of Constraints -controlled productions systems", International Journal of Productions re.

M. Ettl and M. Schwehm (1994): A Design Methodology for Kanban-Controlled Production Lines Using Queuing Networks and Genetic Algorithm' In: Tenth Int. Conf. System Engineering ICSE'94 in Coventry, UK, Coventry, UK, Coventry University Press, pp. 307-314.

McNeil, J., Mackulak G., and Fowler, J., "Indirect Estimation of Cycletime Quantiles from Discrete event Simulation Models Using the Cornish-Fisher Expansion", Proceedings of the 2003 Winter Simulation Conference, 1377-1382.

Nazazal, D., and Mollaghesemi, M., "Critical Tools Identification and Characteristic Curve Construction in a Wafer Fabrication Facility", Proceedings of the 2001 Winter Simulation Conference, 1194-1199.

P.B. Luh, X. Zhou, and R. N. Tomastik, "An Effective Method to Reduce Inventory in Job Shops (PDF format)," IEEE Transactions on Robotics and Automation, vol. 16, No. 4, Aug. 2000, pp. 420-424.

Park, S., Mackulak, G., and Fowler, J., "An Overall Framework for Generating Simulation Based Cycle Time Throughput Curves", Proceedings of the 2001 Winter Simulation Conference, 1178-1187.

Potoradi, J., Winz, G., and Kam, L., "Determining Optimal Lot Size for a Semiconductor Back-End Factory", in Proceedings of the 1999 Winter Simulations Conference, pp. 720-726.

Rosee, O., "CONLOAD—A New Lot Release Rule for Semiconductor Wafer Fabs", in Proceedings of the 1999 Winter Simulation Conference, pp. 850-855.

Ryan, S. M. and J. Vorasaysan. 2004. "Allocating work in process in a multiple-product CONWIP system with lost sales." Forthcoming in International Journal of Production Research.

Ryan, SM, B. Baynat, and F. Choobineh, "Determining Inventory Levels in a CONWIP Controlled Job Shop," IIE Transaction, vol. 32, pp. 105-114, 2000.

Segal, M. and Whitt, W., "A Queueing Network Analyzer for Manufacturing", in Teletraffic Science for New Cost Effective Systems, ITC-12, 1989, p. 1146-1152.

Spearman, M., Woodruff, D., and Hopp, W., "CONWIP: a pull alternative to kanban", International Journal of Production Research, 28:5 (1990), 879-894.

Vandaele, N., De Boeck, L., and Callsweir, D., "An Open Queuing Network for Lead Time Analysis", IIE Transactions, 34 (2002), pp. 1-9.

Whitt, W., "The Queuing Network Analyzer," Bell Sys. Tech. J. 62:9 (1983), 2779-2815.

Yang, F., Ankenman, B., and B. Nelson, "Efficient Generation of Cycle-Time Throughput Curves Through Simulation and Metamodeling", Department of Industrial Engineering Working Paper, Northwestern University, 2004.

Zipkin, Paul H. "Foundations of Inventory Management," pp. 295-349. New York:McGraw Hill, 2000.

Letter from Lester L. Hewitt to John S. Pratt dated Nov. 10, 2005, regarding prior art disclosures with attachments citing prior art references.

Zipkin, Foundations of Inventory Management, 2000, p. 190, McGraw-Hill Companies.

Zhang, Easily Implementable Spare Parts Inventory Policies, Dissertation, Dec. 1994, pp. 31-34, 62 and 69.

Communications Oriented Production Information and Control System, Jul. 1973. pp. 40, 46, 49, vol. 1, IBM Publications, White Plains, New York.

Silver, Edward A., Pyke, David F. and Peterson, Rein, Inventory Management and Production Planning and Scheduling, pp. 44-67, 280-294, 372-376 3rd Edition, JOhn Wiley & Sons, New York.

Knight, Thomas P., Inventory Reduction in a Large Job Shop, Abstracts of Thesis, 1992, pp. 1-2.

CONWIP: CFM for the Large Panel Line, Report for Contract Aggreement, Aug. 1989, pp. 1-17.

Meeting minutes with Alcoa.

Invoice 000710A to Alcoa Technical Center from SAK Logistics, Inc.

CONWIP & Kanban Estimator, 2000.

Invoice 000706A to S&C Electric.

Spearman, Mark L., Flow-Path Management at S&C Electric Robust Methods to Shorten Cycle Times, Improve Planning, Performance, and Reduce Inventory, May 21, 2000, pp. 1-13, SAK Logistics, Tuscaloosa, Alabama.

Invoices 32001A, 000330C, 5023, 5024, 000612E and 5015 to DuPOnt Pharmaceuticals Company.

Gerecke, Glenn and Knight, Tom: Improving Performance and Reducing Cycle Time Using Flow Path Management: A Case Study; Pharmaceutical Engineering, Nov./Dec. 2001, pp. 1-8, vol. 21 No. 6.

Graves, Stephen C.; Franz Edelman Award for Managment Science Achievement; Informs; Jan./Feb. 2000; pp. 1-6; vol. 30 No. 1.

Lambrecht, Marc R., Ivens, Philip L., and Vandaele, Nico J.; ACLIPS: A Capacity and Lead Time Integrated Procedure forScheduling; Management Science; Nov. 1998; pp. 1548-1561; vol. 44 No. 11, Part 1 of 2.

Sale of software to Mr. Sergio Flores of the Catholic University of Valparaiso, Sep. 21, 1998.

Description of Inventory Software Using Exchange Curve Methodology Sold In 2000.

Invoices 000503A, 000612A, 000705A, 000503C, 000612B, 000705A and 000705B to Innovative Home Products.

Echange Curve Analysis Prepared for Innovative Home Products: Cycle Stock Investments vs Number of Orders Per Year.

Shortage Cost Exchange Curve.

Letters to Wesley Searle and William White of Bell & Howell Corporation Regarding Sale of Exchange Curve Methodology Software and Invoices 081092A and 092595A.

Hopp, Wallace J., Spearman, Mark L. and Zhang, Rachel Q.: Easily Implementable Inventory Control Policies; Operations Research; May/Jun. 1997' pp. 327-339; vol. 45 No. 3.

Oracle Advanced Supply Chain Planning and Oracle Glibal ATP Server User's Guide.

Production Planning and Detailed Scheduling, SAP Advanced Planner & Optimizer.

Innovative Home Products: Sequencing Module for Birmingham Garage Doors.

Hopp, Wallace J. and Spearman, Mark L.: Factory Physics: Foundations of Manufacturing Management, Second Edition. Irwin/McGraw Hill, 2001. pp. 505 and 609.

Harris, Ford W.; How Many Parts to make at Once; Factory: The Magazine of Management, 10(2); pp. 135-136, 152.

Hopp, Wallace J., Spearman, Mark L., and Woodruff, David L.; Manufacturing Cybermation Audit Created for STD Austin. Oct. 7, 1998.

Press, William H., Flannery, Brian P., Teukolsky, Saul A., Vetterling, William T.; Numerical Recipes: The Art of Scientific Computing. Cambridge University Press, 1986. pp. 297-301.

Excerpts from i2 Technologies, Inc., From 10-K for FY Ending Dec. 31, 1997.

International Search Report issued in counterpart International Application No. PCT/US06/07919, dated Oct. 23, 2007.

Written Opinion issued in counterpart International Application No. PCT/US06/07919, dated Oct. 23, 2007.

Jun. 2000 prototype, CONWIP Kanban Estimator V6 04 unlocked.xls.

* cited by examiner (Throughput By Flowpath)

Initial Screen For CONWIP tuning

Updated View of System
Performance

ASSOCIATED SYSTEMS AND METHODS FOR IMPROVING PLANNING, SCHEDULING, AND SUPPLY CHAIN MANAGEMENT

RELATED APPLICATIONS

This application claims priority to U.S. Provisional Ser. No. 60/658,717, entitled "ASSOCIATED SYSTEMS AND METHODS FOR IMPROVING PLANNING, SCHEDULING, AND SUPPLY CHAIN MANAGEMENT", filed Mar. 4, 2005, and is a continuation-in-part application of U.S. Ser. No. 10/685,670, entitled "SYSTEMS AND METHODS FOR IMPROVING PLANNING, SCHEDULING, AND SUPPLY CHAIN MANAGEMENT", filed Oct. 14, 2003 now abandoned, which claims priority to U.S. Provisional Ser. No. 60/418,399, entitled "SYSTEMS AND METHODS FOR IMPROVING PLANNING, SCHEDULING, AND SUPPLY CHAIN MANAGEMENT", filed Oct. 11, 2002, the contents of which are all incorporated herein by reference.

FIELD OF THE INVENTION

The invention relates generally to inventory and supply chain management. More particularly, the invention relates to systems and methods for improving planning, scheduling, and supply chain management.

BACKGROUND

Business enterprises, such as manufacturing facilities and companies, can be confronted with the challenge of maximizing service to their customers while minimizing the cost of operations. One primary component of these costs, and a significant factor influencing the level of service delivered to customers, can be the location and amount of inventory stored in a company's supply chain network. In general, higher inventory levels can offer both higher costs and higher levels of service. Conventional inventory management systems may not provide effective mechanisms for optimally configuring an existing supply chain network that include multiple echelons of interacting supply locations subject to uncertainty over the amount and timing of demand for finished products, and subject to uncertainty over the timing and reliability of resupply activities. In order to obtain a solution, various methods of analysis used in conventional inventory management systems can make significant simplifying assumptions, which may limit the applicability of such methods to relatively simple systems or otherwise risking an inaccurate description of the expected performance of the supply chain system.

As disclosed in U.S. patent application Ser. No. 10/685,670, entitled "SYSTEMS AND METHODS FOR IMPROVING PLANNING, SCHEDULING, AND SUPPLY CHAIN MANAGEMENT," a flow path management system (FPMS) or a supply chain management system (SCMS) can include a lot sizer and work in progress (WIP) estimator (LWE) module and an inventory advisor (IA) module. Such systems and modules can be implemented by a computer system, such as 100 in FIG. 1 of the above referenced patent application.

The LWE module can implement methods and/or algorithms to accomplish some or all of the following: (a) identify constrained resources, (b) optimize how many products should be produced together to minimize setups while meeting output goals, and (c) optimize WIP levels to reach throughput and cycle time objectives. Some conventional methods and/or algorithms for inventory management systems can monitor and control the WIP levels in a single loop or subset of items or products in a system or flow path. However, such methods and/or algorithms were limited to applying WIP levels to subsets of items or products in a single flow path, and determining an optimal WIP level for the system aggregated over the various items or products.

The inventory advisor (IA) module can implement methods and/or algorithms to accomplish some or all of the following: (a) determine stocking policies, such as which products should be made to order and which should be made to stock; (b) set reorder policies, such as determining reorder points and reorder quantities for make to stock products; and (c) generate an exchange curve to describe a best cost that can be obtained for a level of performance associated with a particular flow path, system, or set of items or products, such as displaying a policy cost for a single product or for multiple products as a function of order frequency and/or service levels. However, at least some of mathematical equations used by the IA module to analyze inventory policies assume that policy parameters that are manipulated to create the measured performance (i.e. order frequency, and service level) are continuous and unbounded. Furthermore, in some instances when the IA module determined an aggregate performance for a group of products with corresponding exchange curves, there were no assumed dependencies between any of the products.

In addition, the IA module can utilize user input data to describe demand and lead times for a flow path using commonly known statistical techniques such as average and standard deviation. In many instances, a Poisson or normal distribution can be applied to the user input data, and a representation of the flow path performance can be generated by the IA module, however in some instances, the representation of the flow path performance based on such distributions may not be indicative of or otherwise an accurate representation of flow path performance. Therefore, a need for improved systems and methods for an inventory advisor (IA) module exists.

Exchange curves can be generated by an IA module using equally spaced intervals of an intermediate parameter called $\beta$. This variable can be a surrogate for the backorder cost, a parameter which is rarely known by the user. In many instances, displays show the relationship between inventory cost and service level, but the service level varies non-linearly with $\beta$. The result can be that in the points of interest along the exchange curve, and those most likely to be selected by a user interested in such points, such points may be highly concentrated at the high end of the service distribution (near 100%). Therefore, a need for improved systems and methods for generating exchange curves exists.

Approximate equations can be utilized by an IA module to determine an "optimal" reorder point for a flow path. While such equations can be accurate under certain circumstances, in some instances relatively large inaccuracies can be induced when the reorder quantity is low or if the targeted service level is low. Therefore, a need for improved systems and methods to determine a reorder point which describes the probability of a stockout exists.

Conventional inventory management systems can utilize separate methods for determining optimal lot sizes and for determining optimal inventory stocking levels. However, potential interaction between decisions made for optimizing lot sizes and optimizing inventory stocking levels is typically unaccounted for. Such interaction may be particularly evident when a setup carries an identifiable monetary cost, for instance the production of scrap; when a selected lot size has a significant impact on a lead time for a material through a production facility; or when holding costs of products being analyzed suggest that a high cost of some products warrants special treatment (i.e. shorter lead times). The interaction may occur in such cases because lot sizes selected by the LWE module for a particular product may have a direct impact on order quantity and replenishment lead times that affect or otherwise drive selection of a reorder point by an inventory advisor (IA) module.

As disclosed in U.S. patent application Ser. No. 10/685, 670, systems and methods for analyzing inventory in a flow path, also known as "standard single echelon inventory analysis," can rely upon user data input, such as descriptions of statistical distributions for lead time and demand data, as input for a problem solution. Reorder points and reorder quantities can then be determined based in part on the user data input. However, such analysis can provide little or no support for a user to determine what lead time distribution should be given the expected state and demand on an associated manufacturing system. Furthermore, the reorder quantities may not be aligned with constraints of the manufacturing system. Therefore, a need exists for improved systems and methods for analyzing inventory in a flow path.

Various topologies, schematics, and representations have been used to model a flow path or supply chain. In some instances, the topology of a supply chain can impact techniques and/or algorithms available to analyze the supply chain, with relatively more complicated topologies causing more significant and restrictive assumptions in a supply chain analysis. Examples of conventional topologies used to describe and model supply chains are shown in FIG. 16. As conventional theories may focuses on analyzing "pure" assembly, "pure" distribution, or "pure" serial networks, a challenge in solving supply chain problems is producing one or more solutions for supply chain with mixed topologies (i.e. having attributes of more than one of the topologies depicted in FIG. 16). Therefore, a need exists for systems and methods for performing multi-echelon inventory analysis and for optimizing a multi-echelon inventory system.

In conventional inventory management systems, partitioning planning information is sometimes limited to predetermined assumptions which can be used to partition entities into different logical sets. For example, products in an inventory can be partitioned into logical groups such as flow paths. Flow paths can include one or more route steps. Each route step in a flow path can be partitioned into logical groups such as control loops. These flow paths, route steps, control loops, and other logical groups are oftentimes predetermined and assumed partitions used by a conventional inventory management system to perform various performance analyses. However, conventional systems and methods for partitioning planning information can be somewhat inflexible since partitions are assumed, or can be ad hoc, or may otherwise be limited due to applied assumptions. Therefore, a need exists for systems and methods for partitioning planning information.

SUMMARY OF THE INVENTION

Embodiments of the invention can provide methods and systems for determining optimal lot sizes for a particular flow path or system with throughput rates for one or multiple items or products. Determining optimal lot sizes for a particular flow path with throughput rates for one or multiple items or products can be desirable for minimizing an average cycle time to an "optimum" cycle time aggregated over the items or products. Generally, the shorter the average or optimum cycle time, the less time a particular item or product spends in the flow path.

Embodiments of the invention can provide a system and computer-implemented method for determining an optimal lot size for multiple items in a flow path. In one embodiment of the computer-implemented method, the method can include receiving a selection of a lot size for each item in the flow path. In addition, the method can include based at least in part on the selected lot sizes, estimating a respective cycle time for the items in the flow path. Furthermore, the method can include based at least in part on the respective cycle times, determining an aggregate cycle time for the flow path, wherein the aggregate cycle time comprises at least one search direction. Moreover, the method can include based in part on at least the aggregate cycle time, determining whether to modify a lot size for a particular item to optimize the aggregate cycle time. The method can also include if a determination is made to modify a lot size for a particular item, repeating some or all of the above elements as needed by applying an iterative algorithm based in part on Powell's method.

Embodiments of the invention can provide methods and systems for determining optimal work in progress (WIP) levels for subsets of items or products in a flow path or system where activities required to create the finished products can occur in separate production segments or pass through multiple control loops. Such embodiments can establish a set of maximum or optimal WIP levels for production segments in a flow path or system that can allow the system to meet designated goals on throughput without allowing excessive amounts of WIP to build in the flow path or system.

Embodiments of the invention can provide a system and computer-implemented method for determining an optimal work in progress level for multiple items in a flow path. In one embodiment of the computer-implemented method, the method can include providing a user interface capable of outputting a throughput for items in the flow path. The method can also include receiving a selection of a policy for at least one item in the flow path. In addition, the method can include receiving a selected work in progress level for the policy. Moreover, the method can include based at least in part on the selected policy and work in progress level, determining the throughput for each respective item in the flow path. Furthermore, the method can include outputting via the user interface an aggregate throughput associated with the multiple items in the flow path. The method can also include based in part on at least the aggregate throughput, determining whether to modify a work in progress level for a particular item to optimize the aggregate throughput. Further, the method can include if a determination is made to modify a work in progress level for a particular item, repeating some or all of the above elements as needed.

Embodiments of the invention can provide methods and systems for an improved inventory advisor (IA) module. Such embodiments can provide the ability to create one or more exchange curves that account for typical classes of constraints that may be applied by the user, and can provide a user interface that displays both a conventional unconstrained exchange curve and a constrained exchange curve. When evaluating a particular policy, a user may select one or more points from either exchange curve. The presentation of both curves can permit a user to understand the costs of constraints he or she may be imposing on the flow path or system, and provide insight to the user into how he or she may be able to reduce operating costs in the future.

Embodiments of the invention can provide a system and computer-implemented method for providing an exchange curve for an item in a flow path, wherein at least one constraint to the exchange curve can be represented. In one embodiment of the computer-implemented method, the method can include providing a user interface capable of outputting an exchange curve. The method can also include receiving a user selection of a demand and a lead time for the item in the flow path. Furthermore, the method can include based in part on at least a user selection, determining a distribution to apply to the selected demand and lead time for the item in the flow path. Further, the method can include applying the distribution to the selected demand and lead time for the item in the flow path. In addition, the method can include based in part on at least the distribution, outputting an exchange curve via the user interface.

Embodiments of the invention can provide methods and systems for integrating functionality of a lot size module and work in progress (WIP) estimator (LWE) module. Such embodiments can coordinate a lot size optimization decision and an inventory optimization decision so that an optimal lot size can be considered in both the impact on cycle time and the expected impact on inventory carrying cost. In addition, such embodiments can be applied to determining recommended inventory levels at various inventory stocking points, for instance at initial, intermediate, and final points in a manufacturing operation, which may be part of a user's supply chain but exist outside the physical boundaries of a manufacturing facility or building. Examples of locations outside physical boundaries of a manufacturing facility or building can include, but are not limited to, warehouses and distribution centers.

Embodiments of the invention can provide a system and computer-implemented method for determining lot sizes for multiple items in a flow path. The computer-implemented method can include receiving at least one selected lot size for an item in the flow path. In addition, the method can include based at least in part on a selected lot size, determining a cycle time for the item using at least one model. Furthermore, the method can include based at least in part on the selected lot size and cycle time for the item, determine an inventory capable of supporting at least one performance goal. Moreover, the method can include based at least in part on the cycle time and inventory, determining a cost for the policy. Further, the method can include based at least in part on the cost of the policy, determining whether to modify the selected lot size.

Embodiments of the invention can provide methods and systems for optimizing a multi-echelon inventory system. Such embodiments can optimize inventory policies across an existing supply chain network while accounting for uncertainty over demand for finished products, and uncertainty over resupply activities. Further such embodiments can facilitate the combination and implementation of numerical optimization routines which can produce recommended policies based on an approximate view of the system, discrete event simulations which can accurately evaluate the performance of a set of policies under real world assumptions, and a repair procedure which can iteratively modify a recommended policy set based on feedback from one or more discrete event simulations. Furthermore, such embodiments of the present invention can perform some or all of the following: determine recommended inventory levels at intermediate points in a user's manufacturing operation, account for production lead times, determine constraints on production quantities, and analyze and utilize user supplied targets for finished goods service levels or guaranteed lead times to customer orders. In addition, such embodiments can output one or more inventory recommendations to implement inventory decisions, such as meeting required levels of service at the lowest cost given a particular set of system constraints and characteristics described by a user.

Embodiments of the invention can provide a system and computer-implemented method for optimizing a multi-echelon inventory system, wherein the multi-echelon inventory system comprises multiple flow paths. In one embodiment of the computer-implemented method, the method can include receiving inventory data associated with multiple flow paths. The method can also include based at least in part on the inventory data, determining at least one sub-problem. In addition, the method can include based at least in part on the sub-problem, determining a data structure associated with each sub-problem. Moreover, the method can include based at least in part on the data structure for each sub-problem, determining a solution to each sub-problem. Furthermore, the method can include based at least in part on the sub-problem solutions, determining an initial optimization solution for the multi-echelon inventory system.

Embodiments of the invention can provide methods and systems for partitioning planning information. In one embodiment, a user via a user interface can assign entities, such as products or route steps, to particular groups of interest, such as flow paths or control loops. In this manner, a user can partition planning information such as multiple types or quantities of products into differentiated flow paths, and partition various route steps into different control loops. A user may also uniquely assign any number of entities to any number of groups of interest sufficient to support any partitioning task.

Embodiments of the invention can provide a system and computer-implemented method for partitioning a plurality of products. In one embodiment of the computer-implemented method, the method can include identifying a set of products. The method can also include defining an initial set of characteristics associated with at least some of the products. In addition, the method can include evaluating the set of products against the initial set of characteristics, wherein if a particular product comprises a particular characteristic, then the particular product can be rated for the particular characteristic. Moreover, the method can include defining a plurality of set of groups. Furthermore, the method can include defining a set of initial rules. Further, the method can include evaluating the set of initial rules against the set of products and set of initial characteristics, wherein particular products rated with a particular characteristic can be assigned to a particular group based at least in part on a rule in the set of initial rules, and wherein the set of products is evaluated against the set of initial rules until at least some of the set of products are assigned to at least one group.

Other features and advantages of the present invention will be apparent to those skilled in the art with reference to the remaining text and drawings of this application.

DETAILED DESCRIPTION OF EMBODIMENTS

Figure 1:
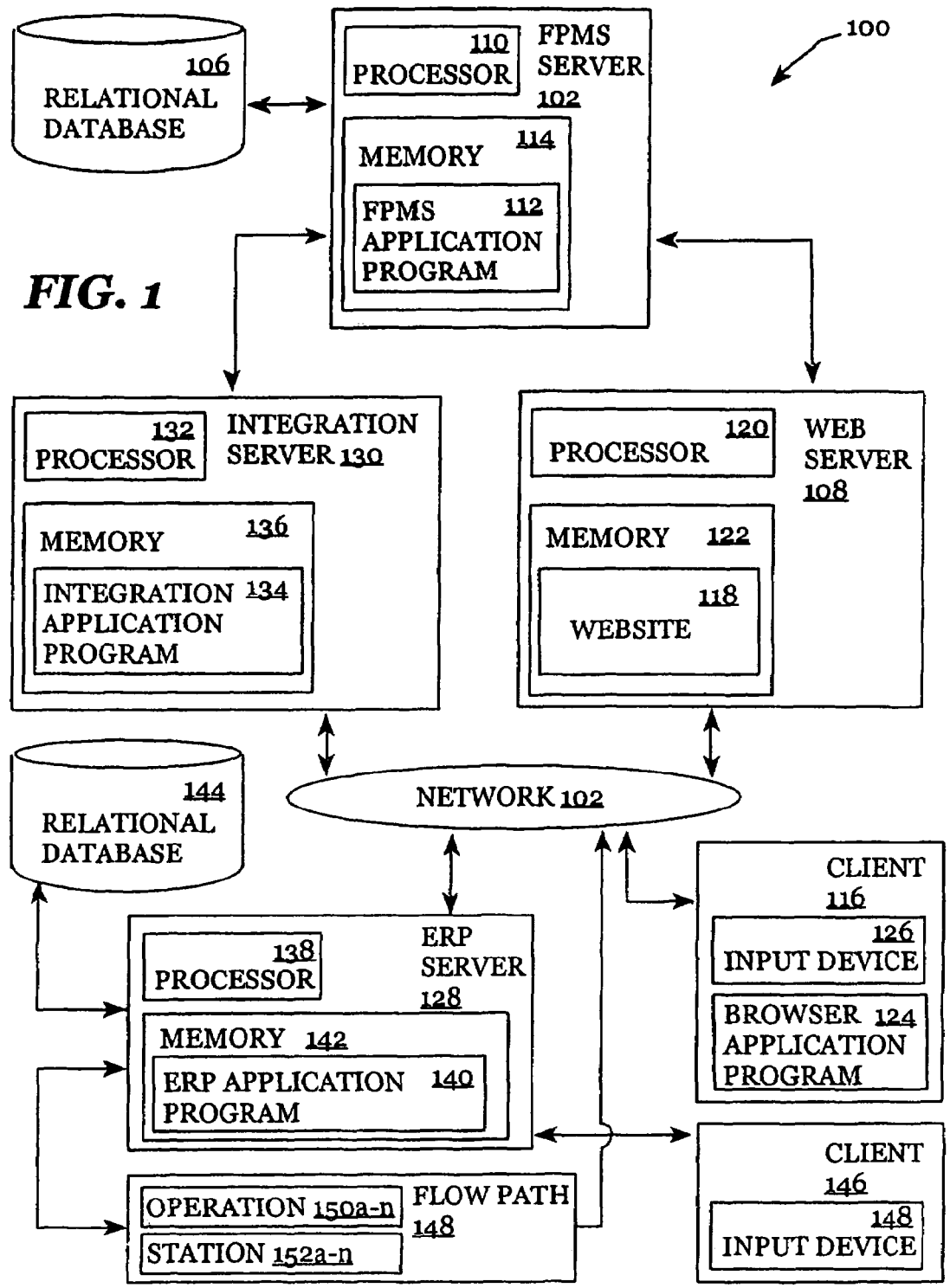
FIG. 1 is a functional block diagram of a system according to various embodiments of the invention.

The systems and methods for improving planning, scheduling, and supply chain management described herein can be implemented by a computer system, such as 100 in FIG. 1. Other embodiments can be implemented with other systems in accordance with the invention.

Various systems in accordance with embodiments of the invention may be constructed. FIG. 1 is a diagram illustrating a system 100 in which embodiments of the invention may operate. The invention may operate and can be embodied in other systems as well. Reference will now be made in detail to exemplary embodiments of the invention as illustrated in the accompanying drawings. The same reference numbers are used throughout the drawings and the following description to refer to the same or like parts.

An example of a system 100 in accordance with various embodiments of the invention is illustrated in the context of a networked computer environment. Other environments exist in which other systems in accordance with various embodiments of the invention can be implemented. The system 100 shown in FIG. 1 is a flow path management system (FPMS) adapted to operate in conjunction with a computer network 102. The system 100 can include a FPMS server 104, a relational database 106, and a web server 108. Other components may be present in a system in accordance with various embodiments of the invention.

The FPMS server 104 can include a processor 110 which can execute one or more software program modules, such as a FPMS application program 112 stored in memory 114. The FPMS application program 112 can be a set of computer-executable instructions or computer program adapted to improve planning, scheduling, and supply chain management. The FPMS application program 112 can include one or more program modules such as, but not limited to, an inventory advisor (IA) module, a lot size and work in progress (WIP) estimator module, a promise date finder (PDF) module, a sequencing module, and a first time through module. Other modules can be included with a FPMS application program 112 in accordance with other embodiments of the invention. In any instance, each of the modules can provide a supply chain planning tool for a user. Note that some or all of the various modules of the FPMS application program 112 can execute and operate from the same or different processor-based platforms. The FPMS application program 112 can operate on any processor-based platform such as the FPMS server 104, another server, a client 116, or a remotely located processor-based device.

The FPMS server 104 can be in communication with one or more databases or data storage devices, such as the relational database 106. Furthermore, the FPMS server 106 can also be in communication with the network 102, the Internet, an intranet, or another network. Through a database such as the relational database 106 or via a network such as the network 102, the FPMS server 104 can receive various data inputs from at least one user operating a client 116. Note that data inputs can also be selection data inputs where the user selects and inputs various data to the client 116. Data inputs and selection data inputs will be referred collectively throughout this specification as "data inputs" or "selection data inputs." Data inputs can include, but are not limited to, demand information, supply information, and supply chain information. Memory 114 and/or relational database 106 can store data inputs received via the network 102 or directly from another source. Other types of data inputs can also be derived, ascertained, or otherwise received and then stored by the FPMS server 104 and its associated components in accordance with various embodiments of the invention.

The web server 108 can be in communication with the FPMS server 104 and the network 102. The web server 108 can be adapted to host a website 118 to receive data inputs via the network 102. The web server 108 can include a processor 120 and memory 122. In general, the website 118 can be accessible by one or more clients 116 in communication with the web server 108 via the network 102.

The client 116 can execute a browser application program 124 such as Internet Explorer™, version 6.0 from Microsoft Corporation; Netscape Navigator™, version 7.1 from Netscape Communications Corporation; and Safari™, version 1.0 from Apple Computer, or other type of browser program for viewing or accessing functionality of the website 118. Users can access the client 116 to utilize the browser application program 124 to view the website 118. Data inputs from a user can be entered via an input device 126 included with the client 116. An input device can include, but is not limited to, a mouse, touch pad, keyboard, touch screen, pointer, voice recognition, scanner, bar code reader, or similar type input device. Note that one or more clients 116 can be in communication with the FPMS server 106, either through the network 102, through the web server 108, direct connectivity, wireless communications, the Internet, or another communications-type network.

One or more legacy-type systems, such as a ERP server 128 or SCM server, can be in communication with the FPMS server 104. Legacy-type systems can be pre-existing inventory management systems that have been installed and operate at a manufacturing facility or company. Each legacy-type system can collect, store, and process inventory data in accordance with the respective legacy-type system's operating system, data format, and protocol. Since legacy-type systems can have different operating systems, data formats, and incompatible protocols, the system 100 can utilize an integration server 130 to handle previously stored and processed data from a legacy-type system. For example, the system 100 can be adapted to integrate with an existing ERP system using enterprise application integration-type (EAI) technology.

In the example shown in FIG. 1, the FPMS server 106 can be in communication with the integration server 130. The integration server 130 can be a processor-based platform adapted to integrate previously stored data from a legacy-type system with data used by the FPMS application program 112. The integration server 130 can include a processor 132, and an integration application program 134 stored in a memory 136. The integration application program 134 can be a set of computer-executable instructions or computer program capable of integrating data inputs from a legacy-type system with data inputs handled by the FPMS application program 112. The integration server 130 can communicate with an ERP server 128 either through the network 102, direct connectivity, wireless communications, the Internet, or another communications-type network. The integration server 130 can pre-process data input received from legacy-type systems, such as the ERP server 128. The data input previously stored by a legacy-type system, such as the ERP server 128, can be processed by the FPMS application program 112.

In general, the ERP server 128 can include a processor 138, and an ERP application program 140 stored in a memory 142. Data inputs can be stored in the memory 142 or in an ERP relational database 144. The ERP application program 140 can be a set of computer-executable instructions or computer program capable of receiving and processing data inputs from a legacy-type system. Other components may exist and operate within or in conjunction with the ERP server. Such components can include, but are not limited to, a supply chain management (SCM) system, a manufacturing execution system (MES), a product lifecycle management (PLM) system, a customer relationship management (CRM) system, or any device or server implementing one or more of these systems. In some instances, a legacy-type system may still be in operation at a manufacturing facility or a company. For example, data inputs previously entered at an ERP client 146 via an associated input device 148 can be transmitted to the ERP server 128 for storage in memory 142 or relational database 144. The ERP application program 140 may process the data inputs according to legacy-type methods, data formats, and protocols. The integration server 130 can retrieve or otherwise access the data inputs from the ERP server 128, memory 142, or relational database 144 via the network 102 or by direct connectivity. Legacy data processed by the integration application program 134 can then be handled by the FPMS application program 112. Those skilled in the art will recognize the various methods and devices needed to integrate legacy data with the system 100 in accordance with various embodiments of the invention.

The ERP server 128 and/or network 102 can be in communication with or otherwise monitor at least one predefined flow path 148. The flow path 148 can include one or more work stations, such as operations 150a-n and/or stations 152a-n. As described above, one or more flow paths can exist in a supply chain. Each flow path can include work stations, such as operations 150a-n and/or stations 152a-n, that a product, item, or good can flow or otherwise be routed through. Inventory data, performance data, routing data, or other data inputs can be determined by or otherwise received from the operations 150a-n and stations 152a-n, and transmitted to the FPMS application program 112 via the ERP server 128 and/or network 102. In some instances, such data can be transmitted directly to the FPMS application program 112 from the flow path 148, or may otherwise be directly received from the flow path 148. Those skilled in the art will recognize the methods and devices utilized to transmit and receive such data.

Other components than those described above may communicate with and operate in conjunction with the FPMS server 104 and FPMS application program 112 in accordance with various embodiments of the invention. Note that those skilled in the art will also recognize that systems and methods in accordance with various embodiments of the invention may be implemented in hardware, software, and/or a combination thereof.

Figure 2:
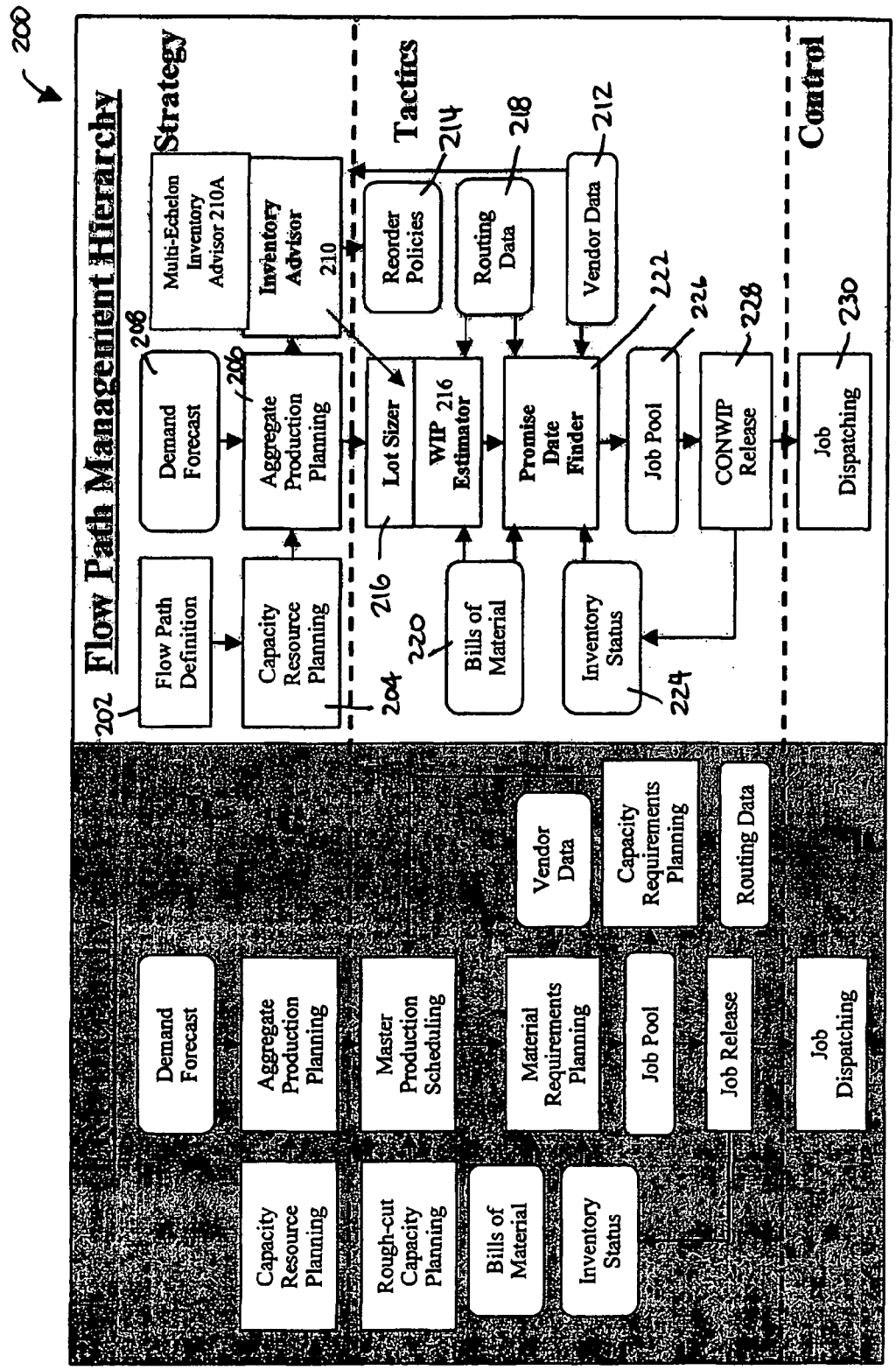
FIG. 2 illustrates a schematic of a planning hierarchy for a program modules for a system according to various embodiments of the invention.

FIG. 2 illustrates a schematic of a planning hierarchy or set of functional modules for a system in accordance with various embodiments of the invention. The planning hierarchy 200 can be implemented by the system 100 shown in FIG. 1. By way of further example, the planning hierarchy 200 can be implemented by a flow path management system (FPMS) application program 112 operating in conjunction with an ERP application program 140 according to various embodiments of the invention. The planning hierarchy 200 shown in FIG. 2 can be characterized by at least three functional layers: strategy, tactics, and control. Fewer or greater numbers of functional layers can be provided, and different layers of functionality may be provided as well. Collectively, the strategy, tactics, and control layer functionalities represent a method for managing a flow path in a supply chain. Blocks 202-210 of planning hierarchy 200 each represent strategy-type functionality or functional modules, blocks 212-228 each represent tactics-type functionality or functional modules, and block 230 represents control-type functionality or a functional module. Fewer or greater types of functionality or functional modules in each respective functional layer can be provided by other embodiments of the invention.

The planning hierarchy 200 begins at block 202, in which a flow path is defined. For example, the flow path management system (FPMS) application program 112 can define a flow path for at least one item in a supply chain. Those skilled in the art will recognize the methods and devices needed to define a flow path.

Block 202 is followed by block 204, in which capacity resource planning is performed. In this example, the FPMS application program 112 can perform capacity resource planning by displaying work center utilization within a LWE module.

Block 204 is followed by block 206, in which aggregate production planning is performed. In this example, the FPMS application program 112 can perform aggregate production planning by displaying product demand and work center utilization within the LWE module.

Also leading to block 206, block 208 can provides a demand forecast to aggregate production planning. In this example, the FPMS application program 112 can determine a demand forecast and provide the forecast for aggregate production planning in block 206.

Block 206 is followed by block 210, in which an inventory advisor module (IA) executes a set of instructions adapted to improve planning, scheduling, and supply chain management. In this example, the FPMS application program 112 can execute a set of instructions or a computer program associated with an inventory advisor (IA) module.

Also leading to block 210, block 212 provides vendor data to the inventory advisor module. In this example, the FPMS application program 112 can provide vendor data to the inventory advisor module.

Block 212 is followed by block 214, in which reorder policies are set. In this example, the FPMS application program 112 can execute a set of instructions associated with the inventory advisor module to set one or more reorder policies.

Referring back to block 206, block 206 is also followed by block 216, in which a lot size and WIP estimator (LWE) module executes. In this example, the FPMS application program 112 can execute a set of instructions or software program associated with the lot sizer and WIP estimator (LWE) module.

Also leading to block 216, block 218 provides routing data. In this example, the FPMS application program 112 can determine routing data and can provide the data to the lot size and WIP estimator (LWE) module.

Furthermore, also leading to block 216, block 220 provides bills of material. In this example, the FPMS application program 112 can provides one or more bills of materials to the lot size and WIP estimator (LWE) module.

Block 214 is followed by block 222, in which a promise date finder module (PDF) executes. In this example, the FPMS application program 112 can execute a set of instructions or computer program associated with the promise date finder module (PDF).

Also leading to block 222, block 224 provides inventory status. In this example, the FPMS application program 112 can provide an inventory status to the promise date finder (PDF) module.

Block 224 is followed by block 226, in which a constant WIP (CONWIP) release is implemented. In this example, the FPMS application program 112 can implement a CONWIP release.

Block 226 is followed by blocks 222 and 230. In block 222, the method 200 returns to inventory status, which is followed by block 222, in which a promise date finder module executes a set of instructions or computer program, and the planning hierarchy 200 continues.

In block 230, job dispatching is performed and the planning hierarchy 200 ends. In this example, the FPMS application program 112 can determine job dispatching.

Referring to particular functional blocks shown in FIG. 2, one module associated with the FPMS application program 112 can be the inventory advisor (IA) module, shown as 210. Based on data input from aggregate production planning and other sources shown in block 206, the IA module 210 can determine and set stocking polices, reorder points, and reorder quantities. The IA module 210 can also determine, based on demand and cost, which goods or items should be "make to stock" and which goods or items should be "make to order." If a determination is made that a particular good or item is to be "made to stock," the IA module 210 can determine the reorder points and reorder quantities for the particular good or item. The IA module 210 can be implemented in an environment with fixed lead times such as when a company is purchasing raw materials or finished goods from vendors.

The IA module 210 can also provide a user with one or more graphical plots of an "efficient frontier" of particular measures such as cycle stock inventory cost versus number of orders per year and safety stock inventory versus customer service rate. Based on inventory and other performance measures, the IA module 210 can determine and display at least one exchange curve. The user can then select a point along or adjacent to the exchange curve in which to manage inventory or set stocking policies for a good or item. An example of an exchange curve is shown as 300 in FIG. 3.

Figure 3:
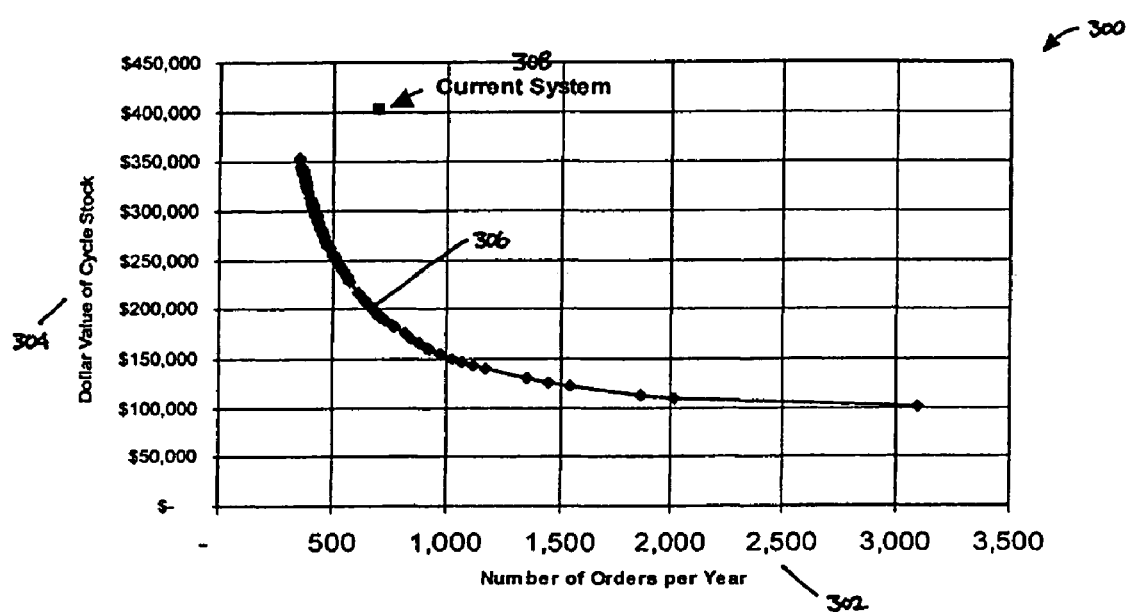
FIG. 3 is an illustration of a user interface provided by a system and method according to various embodiments of the invention.

Referring to FIG. 3, a horizontal x-axis 302 shown represents number of orders per year for a particular good or item. A left-side vertical y-axis 304 represents a dollar value of cycle stock for the particular good or item. A first graphical plot 306 or "exchange curve" represents a particular number of orders per year versus dollar value of cycle stock. A second graphical plot 308 represents a performance measure of where a current system operates. Using the two plots 306, 308, a user such as a planner can compare the performance of a current inventory system against an exchange curve representing one or more "optimum" or "efficient" performance measures plotted versus each other. In the particular example shown in FIG. 3, the graphical plot 308 of the current inventory system performance is shown slightly above the graphical plot 306 for an optimum exchange curve or "efficient frontier." The relative amount of deviation from the exchange curve is indicative of the difference between the current inventory system performance and measure of an optimum or maximum efficiency. Although other practical considerations (e.g., minimum order quantities) may prevent a company from achieving maximum efficiency, the comparison between graphical plots 306, 308 shows that there is a potential for improvement in the inventory decision, and the user can select a point along or adjacent to the exchange curve to operate at.

The IA module 210 can build upon and offer a user a set of exchange curves and can then utilize heuristics which can be incorporated in a database, such as a relational database 106. Often times, previously stored heuristics already exist in an associated ERP server 128 or system. An exchange curve can be determined or otherwise generated using equations, combinations of the equations, or variations of the equations disclosed in U.S. patent application Ser. No. 10/685,670, which is incorporated by reference. The above examples are not intended to be a limitation of the disclosed methods used by the invention to determine an exchange curve.

Referring back to FIG. 2, another module which can be associated with the FPMS application program 112 is a lot size and work in progress (WIP) estimator module 216, or "LWE" module. This module 216 can be adapted to determine and to set lot sizes that minimize time in a flow path. The LWE module 216 can be further adapted to determine when throughput rates for items are feasible. That is, given desired throughput rates for one or multiple items or products, the LWE module 216 can determine whether the throughput rates are feasible, and if so, finds the lot sizes for particular items that minimize the average cycle time to an "optimum" cycle time, aggregated over products. Given this optimum average cycle time, the LWE module 216 can implement a system-wide work-in-progress (WIP) level to use, for example, in a CONWIP or Kanban control scheme.

Furthermore, the LWE module 216 can be adapted to generate graphical plots of selected routing data. Repeatedly used over multiple collections of throughput rates, the LWE module 216 can produce graphical plots depicting various tradeoffs between throughput rate, WIP level and average aggregate cycle time.

The planning hierarchy 200, functionality, and functional modules 200-230 in illustrated in FIG. 2 are shown by way of example, and the functionality and functional modules may be implemented differently according to other embodiments of the invention. Particular functionality or functional modules in accordance with embodiments of invention are described in greater detail below.

Improved Systems and Methods for Determining Optimal Lot Sizes

Determining optimal lot sizes for a particular flow path with throughput rates for one or multiple items or products can be desirable for minimizing an average cycle time to an "optimum" cycle time aggregated over the items or products. Generally, the shorter the average or optimum cycle time, the less time a particular item or product spends in the flow path. Various methods and/or algorithms can be used to determine optimal lot sizes in accordance with embodiments of the invention. Such methods and/or algorithms can be implemented by a system, such as 100 shown in FIG. 1. One or more such methods and/or algorithms can be utilized by a lot size and WIP estimator (LWE) module, for example the LWE module 216 in FIG. 2, to determine optimal lot sizes.

For example, in one embodiment, an iterative application of an algorithm based in part on Powell's method can be used by a LWE module to determine optimal lot sizes. Powell's method is an approach for determining a minimum value for an n-dimensional, unconstrained, non-linear function where it may not desirable or possible to calculate or otherwise estimate the derivative of the function at each point. An example of an algorithm based in part on Powell's method is shown in Chapter 10, Section 10.5 of "Numerical Recipe's in C: The Art of Scientific Computing," ISBN: 0-521-43108-5, Cambridge University Press, 1988-1992.

Continuing from the example above, during each iteration, the algorithm can sequentially search for one or more improvements in the function response along a subset of the available search directions. A search direction can describe a set of variables (product lot sizes in this example) that are being modified simultaneously, the relative direction of the change experienced by each variable, and the relative magnitude of the change experienced by each variable. The starting point for the search in one direction can be the ending point for the search in the previous direction in the set. An algorithm based in part on Powell's method can be an iterative algorithm when the algorithm cycles through a set of search directions more than one time in an attempt to find a minimum.

In another embodiment of the invention, Powell's method can be implemented with additional logic to solve a constrained problem, i.e. there may be values that variables are not allowed to take on. For example, lot sizes for items or products may be above or below specified or predefined levels. Similarly, the set of optimal lot sizes recommended by Powell's method can produce system behavior in which utilization of some or all resources is below approximately 100 percent.

In yet another embodiment of the invention, other gradient search techniques or algorithms can be utilized. For example, a gradient search technique, such as disclosed in U.S. patent application Ser. No. 10/685,670, can be used with embodiments of the invention.

Another method to determine optimal lot sizes in accordance with embodiments of the invention can include fixing a lot size for one or more predefined products or items. In one example of this embodiment, a user can identify a subset of products or items being analyzed and can specify the lot sizes to be used in the lot size analysis. A LWE module can implement a method and/or algorithm, including Powell's method, utilizing the fixed lot size for the one or more user-designated products or items and determining the optimal lot size for other items or products in the flow path. When using Powell's method in this example, products or items identified as having fixed lot sizes are not included in any of the search directions for the algorithm associated with Powell's method. The products can still be included in the analysis of a queuing model, but only at the lot size specified by the user. In this manner, the LWE module can optimize the system around a particular set of products or items whose characteristics have already been defined.

Other methods and/or algorithms can be utilized to determine optimal lot sizes in accordance with embodiments of the invention. For example, ranking criteria which can characterize the influence of batch setup quantities on heavily loaded workstations can be applied to items or products in a flow path being optimized. In one embodiment, a ranking of products or items can be determined based in part on the batch setup quantity for each product or item in a flow path, i.e. a higher ranking can be determined for relatively higher batch setup quantities, and a lower ranking can be determined for relatively lower batch setup quantities. When a ranking criteria is used in conjunction with an algorithm based in part on Powell's method to determine an optimal set of lot sizes, the convergence rate of said method to an optimal solution is shown to be improved.

In another example, ranking criteria can be assigned to respective lot sizes of one or more products according to the relative amount of influence the lot size of a specific product has on the overall performance of the system. Ranking criteria can be determined by heuristically evaluating how significant the respective setup quantities of the particular products are in relation to the respective workstations visited by the products. By evaluating the most influential products first or earlier than other less influential products and/or by more frequently evaluating the lot sizes for the most or more influential products, the speed with which lot size determinations can converge to an optimal lot size can be accelerated.

An example of an algorithm to determine a ranking criteria for use in determining an optimal lot size for a flow path is as follows.

$D_{pw}$ Demand of product p placed on workstation w
$S_{pw}$ Batch Setup time for product p at workstation w
$F_w$ Free Capacity on workstation w, assuming no Batch Setup times
$B_p$ Minimum Batch size for product p
$W_w$ Workstation weight for workstation w
$P_p$ Product score for product p
$W_w = \Sigma(D_{pw} S_{pw})/(F_w B_p)$ summed over all products p that visit workstation w (note that this is a worst case loading on the workstation if all products had the smallest possible lot size)
$P_p = \Sigma W_w D_{pw} S_{pw}/F_w$ summed over all workstations w visited by product p $P_p$ can be used as an indicator for which products have the largest or relatively large influence on system bottleneck capacities. A product can score relatively high on this particular index if the product has relatively large batch setups on machines associated with the workstation and having little or no spare capacity, and the product has batch setups on machines associated with the workstation and such machines are potentially highly oversubscribed (large $W_w$). A product can score relatively low on this particular index if it has shorter batch setup times or if such setups occur on machines that are not heavily loaded. Other ranking criteria for use in determining optimal lot sizes can exist in accordance with other embodiments of the invention.

Improved Systems and Methods for Determining Optimal WIP Levels

Embodiments of the present invention can relate to a coordinated method and system for applying work in progress (WIP) levels to subsets of items or products in a system where activities required to create the finished products can occur in separate production segments or pass through multiple control loops. Such embodiments can establish a set of maximum WIP levels for production segments in a system that can allow the system to meet designated goals on throughput without allowing excessive amounts of WIP to build in the system.

Various methods and/or algorithms can be used to determine an optimal WIP level in accordance with embodiments of the invention. Such methods and/or algorithms can be implemented by a system, such as 100 shown in FIG. 1. One or more such methods and/or algorithms can be utilized by a lot size and WIP estimator (LWE) module, for example the LWE module 216 in FIG. 2, to determine an optimal WIP level.

One such method for determining an optimal WIP level includes a user-directed search. For example, in one embodiment of the invention, a LWE module can implement an iterative method to allow a user to determine an optimal WIP level for a system with multiple control loops and flow paths. An illustration of an embodiment of this method is shown as 400 in FIG. 4.

The method 400 begins at block 402. In block 402, a user can define selected subsets (also known as "loops" or "control loops") of items or products in an overall system, and can further define maximum WIP levels, also known as "policies," for each of the loops. The policies for each loop can then be utilized by a LWE module to determine an optimal WIP level for the system.

In block 402, a user can modify one or more variables of each policy, such as CONWIP levels used for the respective loop. A user may, for example, set the values for a policy vector of CONWIP levels or similar WIP policy for the system. A policy variable can be associated with each loop of the system.

If, for example, a user defines four control loops for a particular flow path. The user can also define a policy for each respective control loop. In this example, the method for determining an optimal WIP level can include determining a vector $V=(a^*, b^*, c^*, d^*)$, where $a^*$ is the CONWIP level of loop 1, $b^*$ is the CONWIP level of loop 2, $c^*$ is the CONWIP level of loop 3, and $d^*$ is the CONWIP level of loop 4. Preferably, in this example, under the policy $(a^*, b^*, c^*, d^*)$ for each loop, all of the target throughputs can be met with a minimum cycle time.

Figure 5:
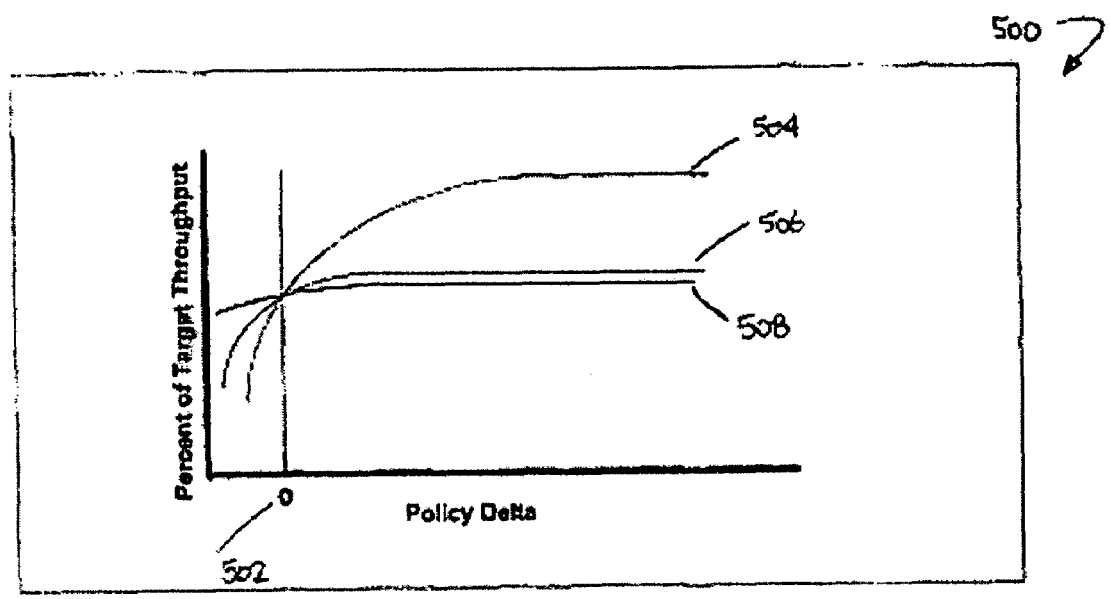
FIG. 5 is another user interface for methods and systems according to various embodiments of the invention.
Figure 6:
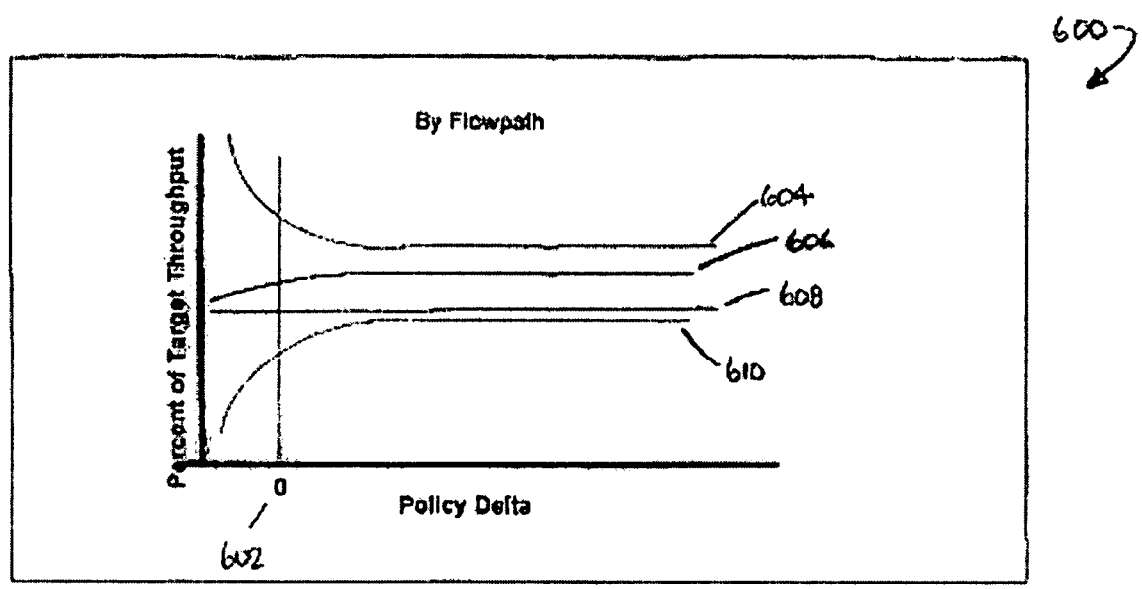
FIG. 6 is another user interface for methods and systems according to various embodiments of the invention.

The example method can continue with one or more hypothesized policy settings, such as $V=(a', b', c', d')$. A user interface, such as 600 and 700 as shown in FIGS. 5 and 6, can output a graphical representation of data, such as one or more graphs of percentage of target throughput versus policy data for each policy. Other user interfaces in accordance with other embodiments of the invention can display other types of graphical representations and/or indicia. The zero (0) point, shown as 502, 602 in FIGS. 5 and 6, can represent the throughput for a particular or current policy. The curves 504, 506, 508, 604, 606, 608, 610 in FIGS. 5 and 6 can show the various throughput changes for the entire system or flow path as a single WIP policy variable is modified.

The user can select one of the points on a particular curve, such as in FIGS. 5 and 6, to create a new base policy. If, for example, the user selects a point where x=3 for control loop 1, the selection can be received by the system, and a corresponding policy can be generated, such as $V=(a'+3, b', c', d')$. The selection and resulting policy can be utilized by the system to regenerate or otherwise display one or more graphs on the user interface, such as 500 and 600, to demonstrate the response of the throughput to one or more of the changing variables from the new starting point.

Generally, a LWE module can implement methods and/or techniques such as discrete event simulation to perform data analysis such as aggregate throughput analysis. Such analysis can illustrate one or more changes in total system throughput against a target throughput as the result of changing a single policy variable, such as WIP level. Information generated from methods and/or techniques such as discrete event simulation can effectively provide partial derivative information for the system response as a function of each policy variable (WIP level).

For example, as described above in FIG. 5, each curve 504, 506, 508 can represent the system throughput as a function of a different WIP policy for one of the control loops of the system or flow path. The zero (0) point 502 in FIG. 5 can represent the throughput achieved with the current policy. The units of the x-axis reflect the degree to which the current policy level can be changed.

If the current solution is sufficient, the user can publish or otherwise implement the current policy set. If the current solution is not sufficient or otherwise requires modification, the user can analyze the throughput response in greater detail by selecting a curve of interest, such as 504, and implementing a single loop control analysis on the particular curve.

For example, as described above with respect to FIG. 6, the user may view the user interface 600 with results of an analysis generated using discrete event simulation. Viewing curves 604, 606, 608, 610 the user can analyze in greater detail how throughput in the system changes in response to the modification of a single WIP policy. Throughput changes can be described in terms of throughput along the respective flow paths. FIG. 6 illustrates several of the conditions that may occur. As illustrated by the upper curve 604, throughput along the flow path decreases as the WIP policy for the loop in question is increased. This may occur if products on the flow path do not flow through the control loop in question but do compete for resources with products that do flow through the control loop in question. As illustrated by the lower central curve 608, throughput along the flow does not change much at all in response to changes in the WIP policy being investigated. As illustrated by the upper central 606 and lower curves 610, throughput along the flow paths increase as WIP policy for the control loop in question is increased. The curves 604, 606, 608, 610 illustrated in this Figure are by way of example only, and in other embodiments of the invention, other curves may be generated for control loops that regulate the flow of items or products on more than one flow path if the same or similar equipment resources are used across the flow paths.

Thus, through a user interface, such as 500 and 600, operating in conjunction with the LWE module, the user can change various policy settings for the WIP policy currently being viewed. If the user desires, the entire system can be re-analyzed using discrete event simulation or a different type of simulation, and the user may continue with an aggregate throughput analysis or select a different type of analysis. The response curves presented for the selected analysis can updated to reflect the new WIP policy as selected by the user in the previous iteration.

Another embodiment of the present invention includes a method which is a variant of the user-directed search described above. This method is based on similar iterative principles illustrated in FIG. 4 and can assist a user's decision making by guiding a user's search using a set of indicia, such as a set of color coded decision criteria, that indicate whether the performance of the system is sufficient under the current settings.

Figure 7:
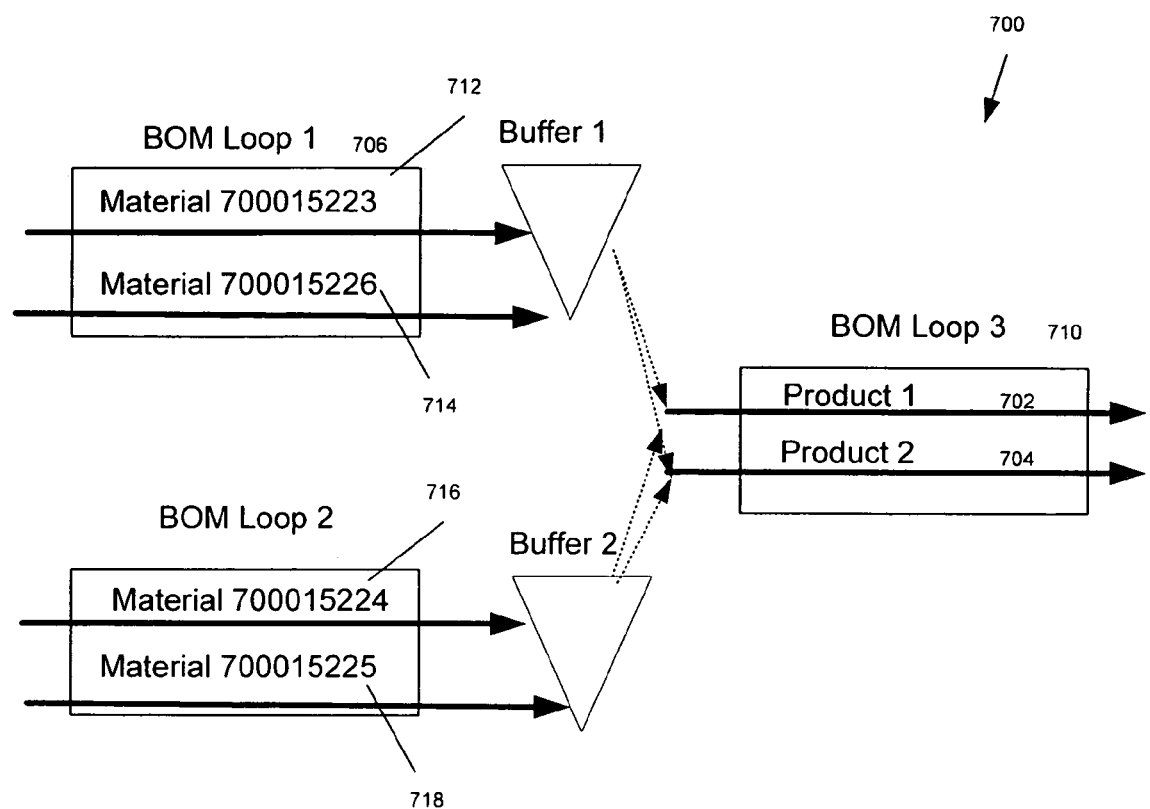
FIG. 7 is a schematic view of a flow path for multiple items and products according to various embodiments of the invention.

To illustrate the effect of finding an optimal WIP for multiple items or products in a flow path, FIG. 7 provides a schematic view of multiple items and products in a flow path. FIG. 7 shows a flow path 700, for instance in a manufacturing supply chain, that produces two finished products, such as Product 1 702 and Product 2 704. Each of the products 702, 704 can be processed by one or more loops or policies, such as 706, 708, and 710. Each of the loops or policies may process one or more materials, such as 712, 714, 716, and 718. For example, output from a first loop such as BOM Loop 1 706 and a second loop such as BOM Loop 2 708 can be combined to manufacture products 702, 704 shown in a third loop such as BOM Loop 3 706. Each loop can include various associated manufacturing equipment and processes (not shown). Each unit of Product 1 702 may require one unit of a first material, such as Material 700015223 712, and one unit of a second material, such as Material 700015224 714, as raw materials for production. These materials 712, 714 can be produced by the resources and processes controlled by BOM Loop 1 706 and BOM Loop 2 708 respectively. A similar requirement can exist for Product 2 704, which may require one unit of Material 700015226 716 and one unit of Material 700015225 718 as raw materials for the production activity in BOM Loop 3 706. In this example, the ability to obtain a target throughput for the finished products Product 1 702 and Product 2 704 may be dependent on the combined CONWIP levels allowed for BOM Loop 1 706, BOM Loop 2 708, and BOM Loop 3 710. Setting any one of the WIP levels independent of the others may not allow a user to achieve the desired throughput through the flow path 700, and similarly any analysis that evaluates BOM Loop 1 706, BOM Loop 2 708, and BOM Loop 3 710 in isolation may not allow the user to find acceptable WIP levels for each of the loops 706, 708, 710.

Figure 8:
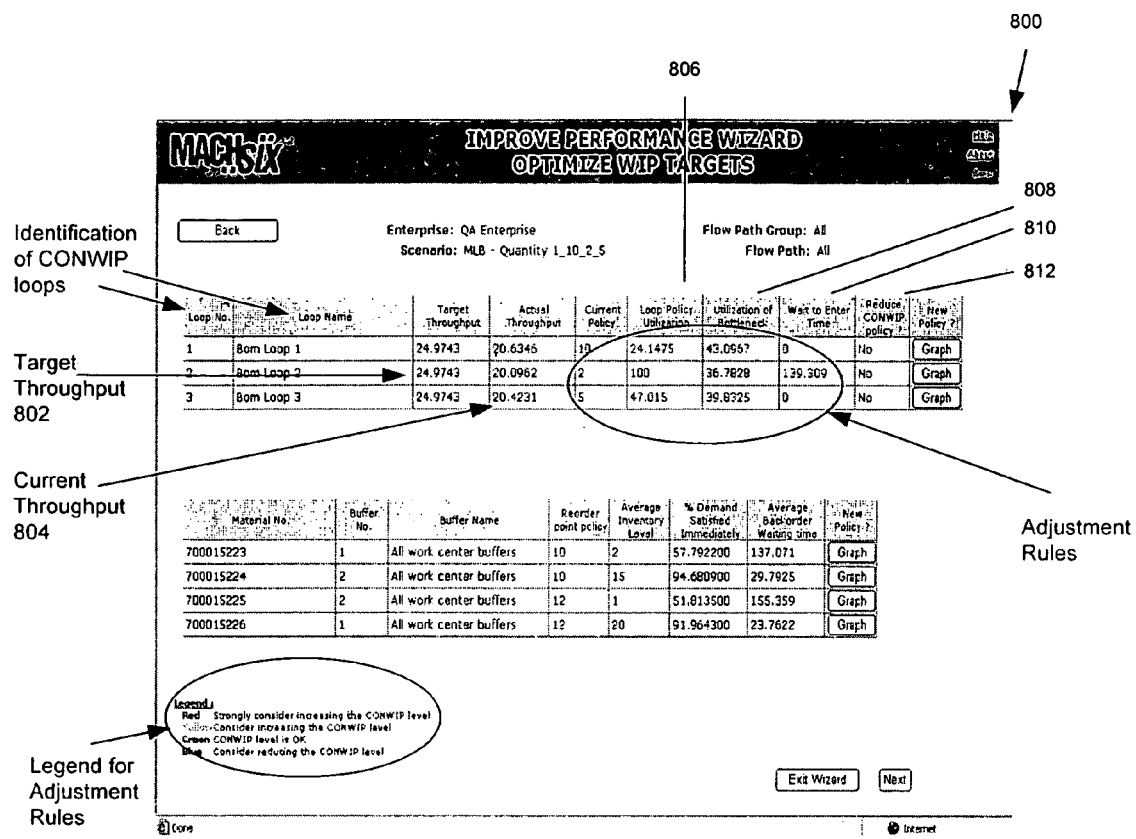
FIGS. 8, 9, and 10 illustrate user interfaces in accordance with various embodiments of the invention.
Figure 9:
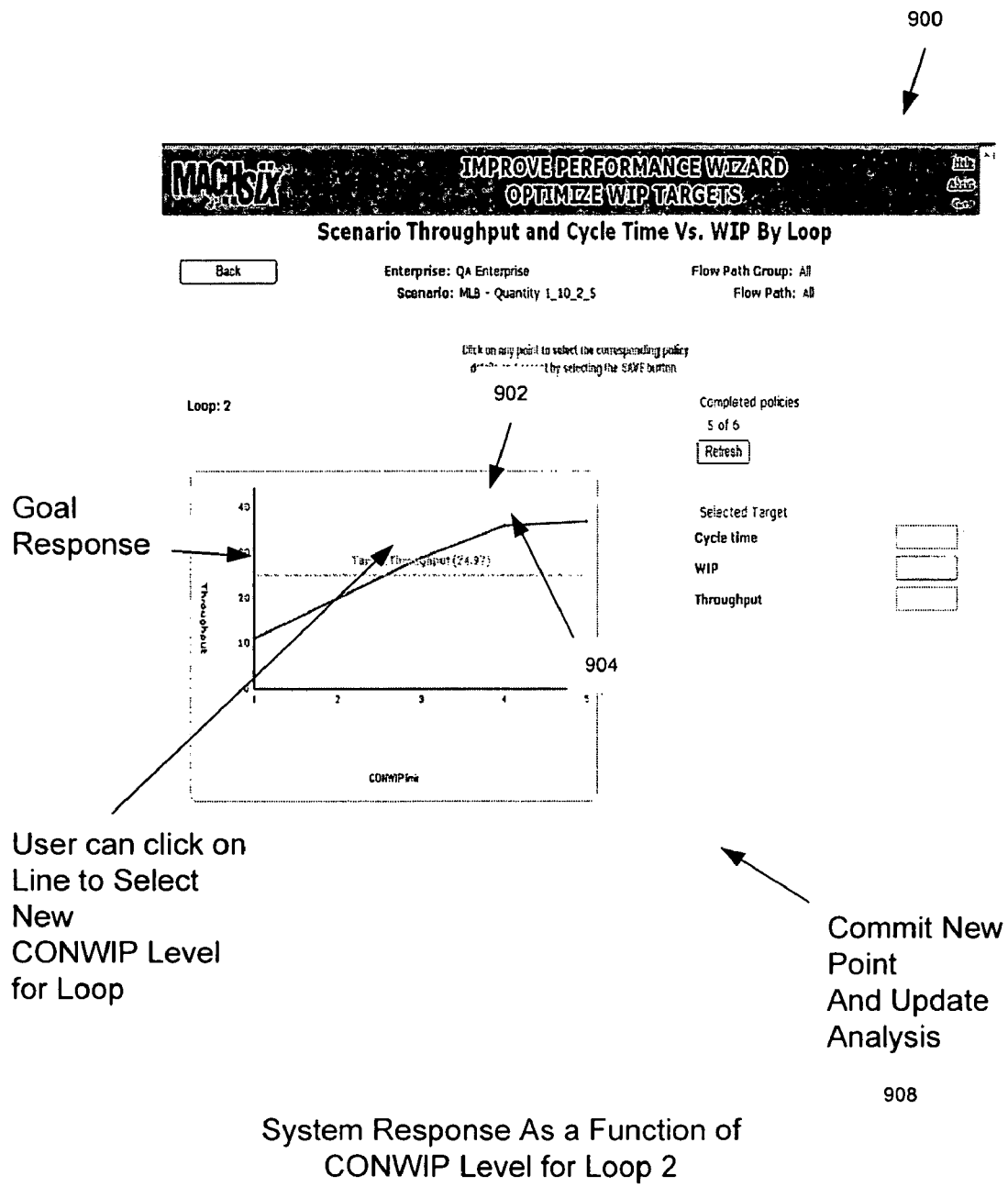

FIGS. 8 and 9 illustrate user interfaces in accordance with an embodiment of the invention. In FIG. 8, a user interface 800 such as a graphical interface or table can display realization of the aggregate throughput from FIG. 7. The user interface 800 shows the results of the aggregate throughput analysis for a given initial set of policies for the flow path described in FIG. 7. In the example shown in FIG. 8, an average target system throughput 802 of approximately 24.9 units per week may be desired to meet expected demand. Under the current policy the throughput for finished products 804 can be estimated at approximately 20.4 units per week. The columns titled "Loop Policy Utilization" 806, "Utilization of Bottleneck" 808, "Wait to Enter Time" 810 and "Reduce CONWIP policy" 812 can provide performance statistics associated with the control loops of the flow path, such as 706, 708, and 710 shown in FIG. 7. The entries in each row may include an indicia, such as a color code, to indicate if the current performance levels are of concern. For example, a color code of green can indicate the statistic is not of concern and is acceptable, a color code of red can indicate the statistic suggests the CONWIP level should be increased or otherwise changed, and a color code of blue can indicate the CONWIP level should be decreased or otherwise changed. Other embodiments of the invention can include other indicia, colors, color codes, or other combinations of meanings or interpretations.

In the example shown in FIG. 8, two of the entries for BOM Loop 2 may be coded red indicating that the current CONWIP level is constraining throughput of the system. The user may click on a button titled "Graph" 812 in the appropriate row of the table to generate a graphical representation, such as a response curve, that illustrates how the flow path or system throughput changes as the selected CONWIP level is changed and all of the other CONWIP levels are held at their current levels. An example of a response curve is shown in the user interface 900 of FIG. 9.

FIG. 9 illustrates a system response as a function of changing the CONWIP policy for a single loop. In this example, a response curve 902 may describe for a user that the system throughput is highly sensitive to the current settings up until a CONWIP level of 4, after which this loop ceases to be the bottleneck (this is indicated by the flat portion 904 of the curve 902).

Figure 4:
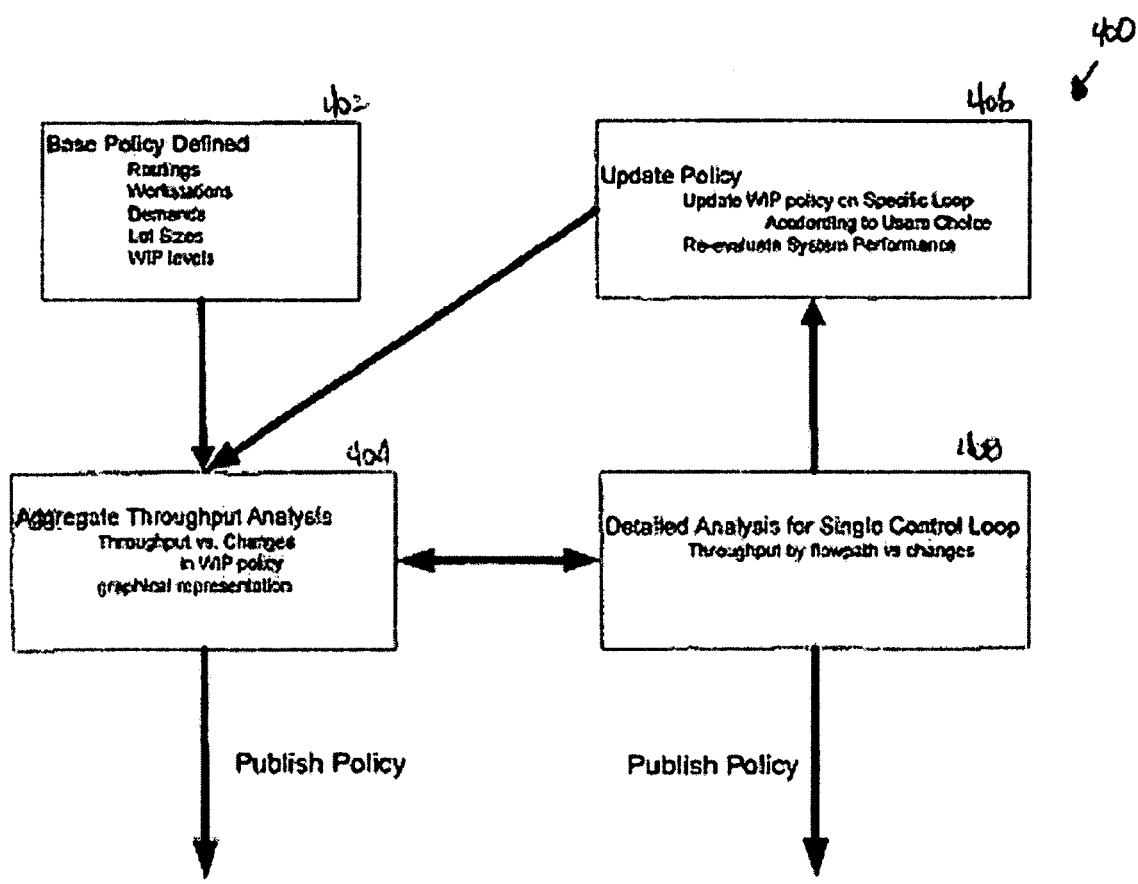
FIG. 4 is a flowchart of a method for optimizing lot sizes according to various embodiments of the invention.
Figure 10:
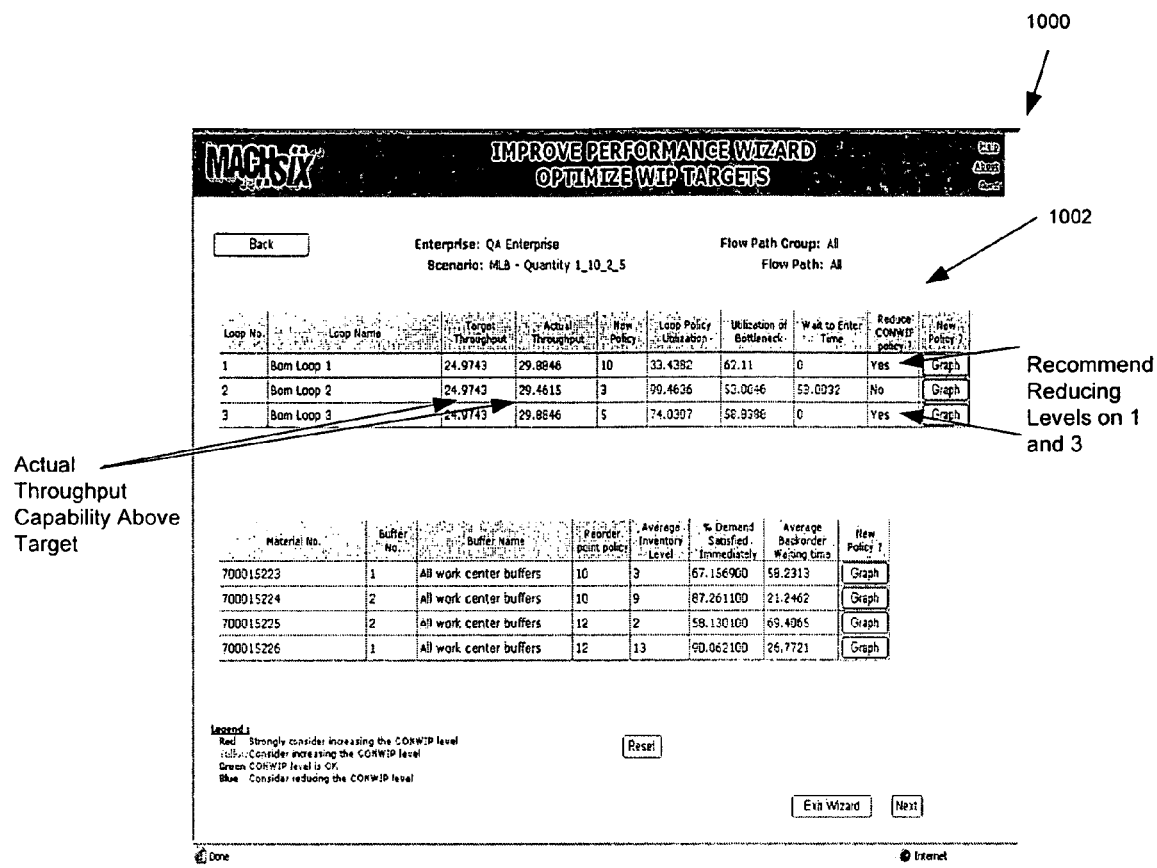

The user interface 900 can implement the functionality described by the Detailed Analysis for a Single Control Loop block 408 of FIG. 4. For example, a user can click a point 906 on the curve 902 to select a new CONWIP policy for the loop and then commit the selected policy by clicking on the button marked "Save" 908. Selecting a new policy (or maintaining the existing policy) can returns the user to an updated aggregate analysis screen or user interface 1000 shown in FIG. 10, which is similar to the user interface 800 shown in FIG. 8. As illustrated in FIG. 10, the flow path or system performance has been re-analyzed in view of the new policy settings selected by the user, and the user is presented with a new set of performance summaries 1002.

In this example, FIG. 10 represents a result if the user had selected a new CONWIP policy of 3 for BOM Level 2. The performance summary 1002 has been updated to reflect this change and a comparison of FIG. 8 with FIG. 10 shows that the flow path or system now meets the targeted throughput. In some instances, as shown in this example, indicia such as color codes may suggest that the policies on one or more loops, here BOM Loop 1 and BOM Loop 3, can be reduced or otherwise modified without adversely affecting the flow path or system throughput. This may be desirable to prevent some segments of the flow path or system from overproducing in the case of an unanticipated failure. Other embodiments of the invention can utilize other indicia to alert a user to adverse or positive conditions.

Improved Systems and Methods for an Inventory Advisor Module

Figure 11:
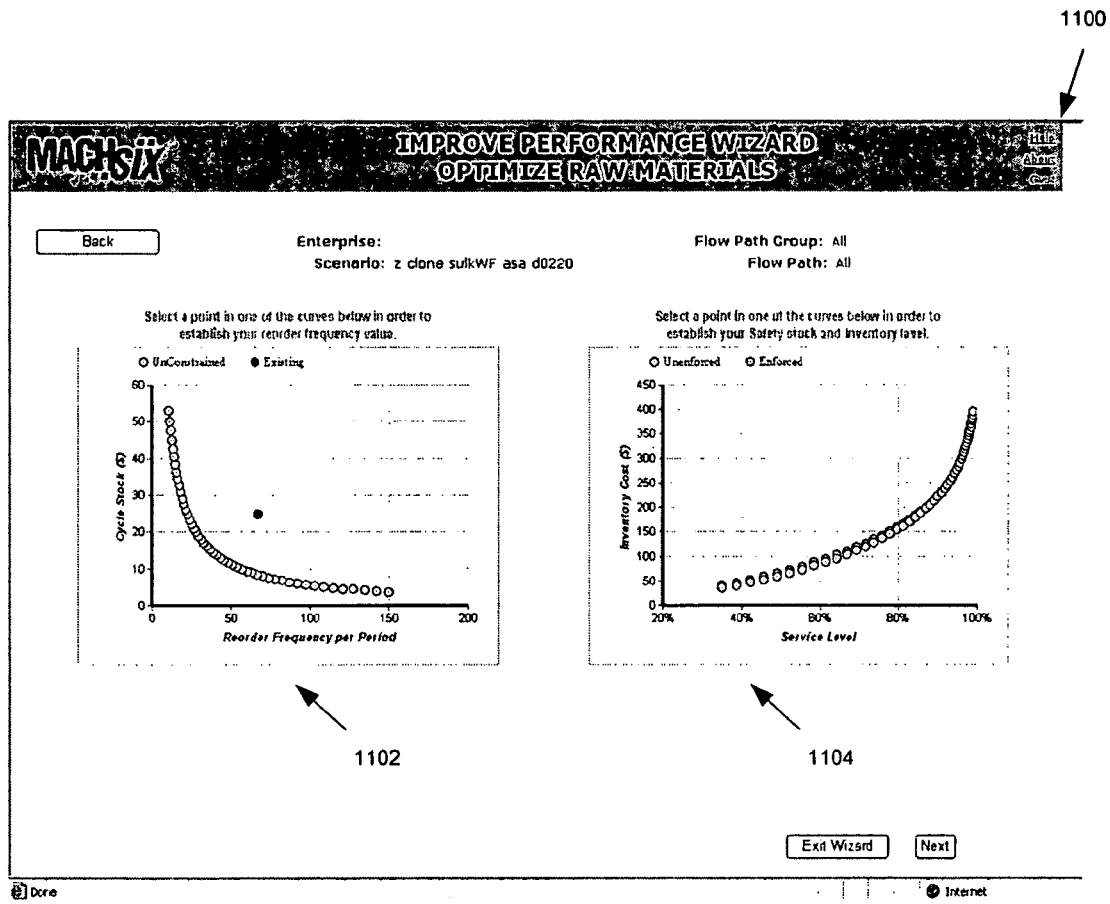
FIGS. 11 and 12 illustrate user interfaces in accordance with various embodiments of the invention.
Figure 12:
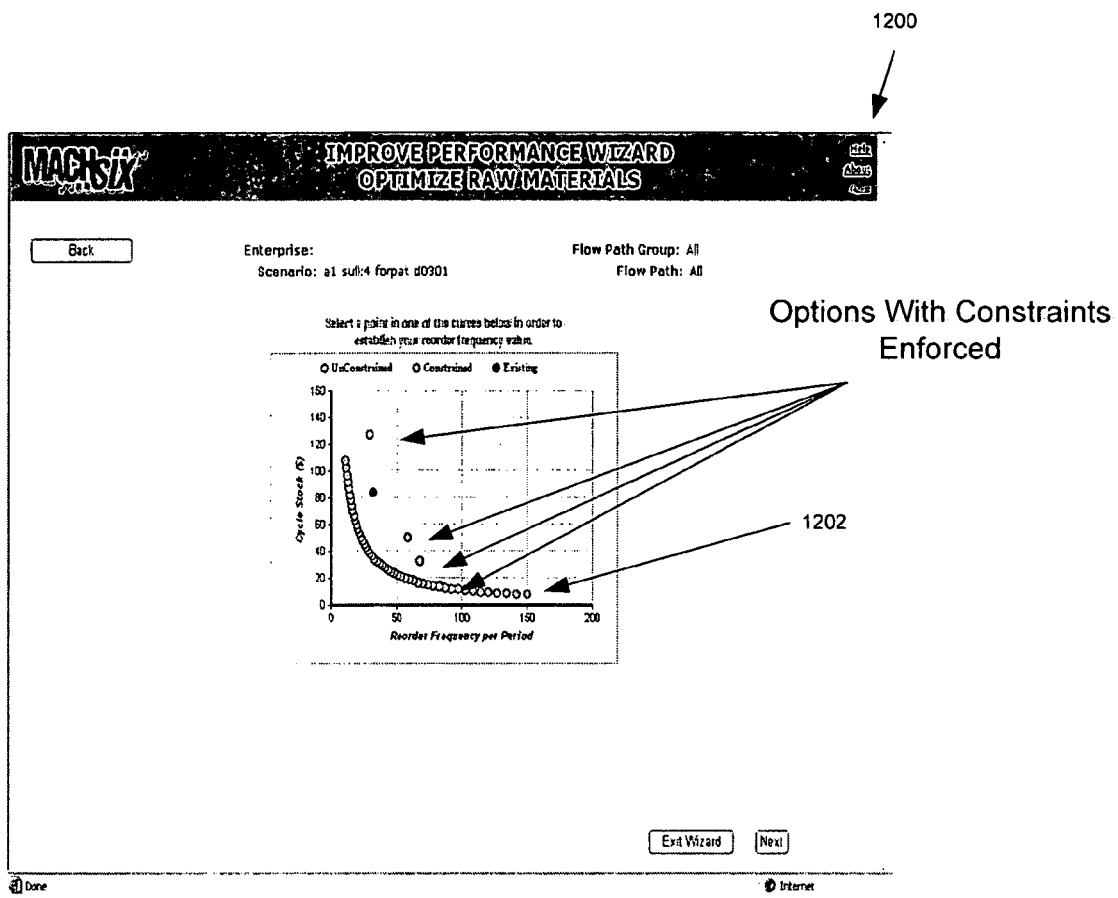

Embodiments of the present invention can include improvements to conventional exchange curves and user interfaces. Such embodiments can provide the ability to create one or more exchange curves that account for typical classes of constraints that may be applied by the user, and can provide a user interface that displays both a conventional unconstrained exchange curve and a constrained exchange curve. As shown in FIG. 11, the left hand curve 1102 shows a constrained exchange curve, and the right hand curve 1104 shows an unconstrained exchange curve for an order frequency problem. Other embodiments of a constrained exchange curve can include constraints such as a minimum order quantity or a requirement that an order be in a predefined multiples. For example, in FIG. 12, a user interface 1200 can display an exchange curve 1202 with multiple constraints 1204. In general, constraints can limit the range of policies a user can select from while enforcing other predefined ordering constraints. In contrast, conventional exchange curves, such as 1104 in FIG. 11, can provide a view of a constrained solution for the inventory cost versus service level exchange curve in which a user can require some or all products to have similar performance. Conventional optimization routines can generate the optimal unconstrained solutions for both the order frequency and the service level exchange curves by assuming that, at each point on the exchange curve, the behavior of every product is defined by a common ordering cost or stockout penalty. A point for the exchange curve is determined by calculating an optimal response of each product to a given cost parameter and reporting the aggregate inventory costs and performance (order frequency or service level) of these products. When constraints are applied, some products can act as though they are operating under more expensive ordering costs (such as stockout penalties) than other products in the group.

Referring to the user interface 1100 in FIG. 11, when evaluating a particular policy, a user may select one or more points from either exchange curve 1102, 1104. The presentation of both curves 1102, 1104 in the user interface 1100 can permit a user to understand the costs of one or more constraints he or she may be imposing on the associated flow path or system, and provide insight to the user into how future operating costs can be reduced for the flow path or system.

Embodiments of the present invention can permit a user to select or otherwise input one or more constraints for an exchange curve. For example, a user can select via a user interface, such as 1100 or 1200, one or more choices for an order frequency, which may be influenced by minimum order quantities (which can create a maximum order frequency for the product) or requirements that associated materials be ordered in multiples of a particular quantity. If these values are relatively large compared to the rate of demand, the impact of these constraints may have a significant impact on the true costs of the solutions available to a user. In particular, by way of example, multiple industrial chemicals can be purchased in pallet load, trailer load, or rail car quantities which may support a significant volume of production. If such constraints exist, these may be directly relevant to the generation of a cycle stock cost exchange curve. In some instances, the system under consideration may be highly constrained and the constrained version of an associated exchange curve may not be continuously defined across the range of order frequencies of interest. That is, because of restrictions on how a particular material can be ordered, it may not be possible to determine a solution for every order frequency in the range specified by a user. Similarly, when generating an exchange curve for safety stock versus expected number of stockouts or service level, a user may desire via a user interface to place one or more constraints on minimum levels of service for particular products, or may desire to ensure that some or all products in a group display a similar level of performance. Embodiments of the present invention can provide a user interface, such as 1100 and 1200 shown in FIGS. 11 and 12 respectively, to input constraints for an exchange curve and analyze any corresponding effects of the constraints.

The following generally describes methods for determining solutions for two particular classes of exchange curves in accordance with embodiments of the invention. In other embodiments, other methods for determining solutions for other exchange curves can be utilized.

Cycle Stock versus Order Frequency Exchange Curve

Given a set of products $P=\{P_1 \ldots P_i\}$, with each product $P_i$, characterized by a product cost $C_i$, a holding rate $H_i$ and an average Demand $D_i$, for a given order frequency a solution can be determined for finding the order quantity $Q_i$ for each product that satisfies the following optimization problem:

$$\text{Min: } CycleStockCost = \sum_{i=1,\ldots,N} \left(\frac{1}{2}\right) * C_i * Q_i \quad (1)$$

$$S.T. \quad TotalNumberofOrders = \sum_{i=1,\ldots,N} \frac{D_i}{Q_i}$$

One assumption that can be made is that order quantities $Q_i$ can follow the following economic order quantity relationship where the value $\alpha$ can be a description of the ordering cost;

$$Q_i = \sqrt{\frac{2\alpha D_i}{H_i C_i}}$$

In one embodiment of the invention, a method to determine a solution for a cycle stock versus order frequency exchange curve is as follows:

1. Determine an upper and lower bound order frequency of interest to a user.
2. Using a technique, such as Lagrangian relaxation, determine the value of $\alpha$, $\alpha_L$, for which an optimal solution of step (1) can produce the specified lower bound order frequency of interest. Similarly, use a technique, such as Lagrangian relaxation, to determine the value of $\alpha$, $\alpha_U$, for which an optimal solution of (1) can produce the specified upper bound order frequency of interest.
3. All solutions of interest can be consistent with values of $\alpha$ where $\alpha_L < \alpha < \alpha_U$. As desired, a user can sample as many values of $\alpha$ in this range for the corresponding exchange curve.
4. At each sampled value of $\alpha$, a value of $Q_i$ can be calculated for each product $P_i$ consistent with $\alpha$. The value of $Q_i$ can be rounded to the nearest feasible value according to one or more constraints supplied by the user, and the aggregate cycle stock cost and order frequency can be calculated for the group. If the calculated order frequency is in the range of order frequencies of interest, the point can be added to the exchange curve.

Some or all of the above steps can be implemented by the method. Other embodiments of a method in accordance with embodiments of the invention can have fewer or greater steps.

Inventory Cost versus Fill Rate (Stockout Frequency) Exchange Curve

In another embodiment, a exchange curve can be calculated when there is a relationship to a level of customer service. This particular embodiment can include a method for creating a constrained curve for the cycle service level (commonly termed "the probability of stockout") where a user can require that each product has an individual level of performance within a defined tolerance, +/−t, of an average performance of the group.

Given a set of products $P=\{P_1 \ldots P_i\}$, with each product $P_i$, characterized by a product cost $C_i$, a holding rate $H_i$ an average Demand $D_i$, and an order quantity $Q_i$, subject to a stockout penalty of $\beta$, an optimal cycle service level that can balance holding costs versus stockout penalties is:

$$fr1 = \frac{\beta * D}{(\beta * D + H * C * Q)} \quad (2)$$

The aggregate performance of the group is:

$$Agg.fr1 = \frac{\sum_{i \in P} fr2_i * D_i}{\sum_{i \in FP} D_i} \quad (3)$$

Given the above relationship, an embodiment of a method for creating a constrained exchange curve for inventory cost versus cycle service level (or probability of stockout) is as follows:

1. Determine an upper and lower level of service of interest to a user.
2. Use a technique, such as Lagrangian relaxation, to determine the values of β that produce an aggregate cycle service level at the upper and lower levels of interest to the user. These values of β can determine the range of backorder penalties to be considered for the analysis.
3. Sample as many values of β between the lowest and highest value of β determined in step (2) as points are desired for the exchange curve.
4. For each sampled value of b, determine the aggregate service level using steps (2) and (3). This can be the unconstrained performance and may be the target level of performance, P*.
5. Check whether all of the products in the set P have individual performance levels that are within predefined bounds of the target. If all products are within the tolerance level of the target, no modifications may be necessary and the procedure can continue at step (9). Otherwise, if all products are not within the tolerance level of the target, then procedure can proceed to step (6).
6. Choose the product in the set P that is the furthest from the tolerance. If the individual performance is above the target, fix its performance at min(P*+t,100); and if it is below the target, fix its performance at (P*−t,100). Remove the product in question, $P_j$, from the list of active products.
7. Use a technique, such as Lagrangian relaxation, with the remaining active products to determine the value of β that will produce the aggregate performance P* across the remaining active products.
8. If the individual performance of all of the products in within (max(0,P*−t),min(100,P*+t)), then go to step (9). Otherwise return to step (6), and choose another product from the set of active products whose performance will be fixed.
9. Calculate an actual aggregate performance across the group using step (3), where, for products whose performance was fixed in step (6) the value of fr1 is taken as either max(0, P*−t) or min(100,P*+t), and the performance of all unfixed products is calculated using the last value of β and equation (2).
10. Add the new point to the constrained exchange curve.

Some or all of the above steps can be implemented by the method described above. Other embodiments of a method in accordance with embodiments of the invention can have fewer or greater steps than described herein.

Improved methods and/or algorithms which characterize user input data describing demand and lead times for a flow path can improve the use of such data by an inventory advisor (IA) module, such as 210 in FIG. 2, associated with a system, such as 100 shown in FIG. 1. The underlying methods and/or algorithms implemented by an IA module can implement a computable probability distribution so that an estimate can be made of the probability of certain events occurring (a stockout occurring during a replenishment period, the probability of a demand not being satisfied). The optimizations can characterize the probability of such events occurring based on the underlying distribution. However, for some input parameters, particularly when the normal distribution is assumed and applied, significant portions of the distribution can exist in regions that can imply that system behavior is infeasible. Though the distribution may be consistent with the input parameters (mean, standard deviation), a portion of the distribution can be invalid. For example, under some parameters the use of a normal distribution to describe demand may imply a significant probability for the occurrence of negative demand during a period. Improving the methods and/or algorithms which characterize user input data by applying other distributions can increase the ability of an IA module to accurately reflect phenomena described by the user input data.

Embodiments of the present invention can utilize user input data to indicate when a random or other suitable distribution may be used by an IA module to describe the demand and lead times for the particular flow path or system. An initial screening of user input data can include applying statistical techniques or algorithms, such as distribution, mean, standard deviation, to the user input data. In one example, the screening can compare a coefficient of variation of the user input data with one or more predefined values corresponding with a particular type of distribution to apply to the user input data. In this manner, a suitable distribution, method and/or algorithm can be selected by an IA module to describe the demand and lead times for a particular flow path or system.

An example of a screening process in accordance with an embodiment of the invention is as follows.

Assume at least the following:

| | |
|---|---|
| L = | average replenishment lead time |
| $\sigma_L$ = | standard deviation of the replenishment lead time |
| D = | average period demand |
| $\sigma_D$ = | standard deviation of the period demand |

The quantity, $SCV_{LTD} = SQRT\ (L*\sigma_D*\sigma_D + D*D*\sigma_L*\sigma_L)/D*L$, can be determined, and evaluated as an indicator by an IA module to select an underlying demand distribution. One or more previously determined distributions, methods and/or algorithms for ranges of the quantity can be selected. By way of example, the following distributions, methods and/or algorithms can apply to particular ranges for the quantity determined above.

| | |
|---|---|
| $SCV_{LTD} < 0.5$, | Apply a normal distribution for lead time demand |
| $0.5 <= SCV_{LTD} < 1$ | Apply a Gamma distribution for lead time demand |
| $SCV_{LTD} > 1$ | Apply a Compound Bernoulli process |

In other embodiments, an IA module can utilize other distributions, methods and/or algorithms, and any combinations thereof and apply them to particular values or ranges of values characterizing user input data describing demand and lead times for a flow path.

Improved methods and/or algorithms for generating exchange curves for a flow path or system can enhance the display of information via the exchange curves by an inventory advisor (IA) module, such as 210 in FIG. 2. For example, the exchange curve 1104 on the right hand side of the user interface 1100 in FIG. 11 shows the relationship between inventory cost and service level, but the service level varies non-linearly with an intermediate parameter β. This variable is a surrogate for the backorder cost, a parameter which is rarely known by a user viewing the exchange curves. The result is that the points or data of interest along the exchange curve that the user can choose from are highly concentrated at the high end of the service distribution (near 100%).

In one embodiment, methods and/or algorithms implemented by an IA module, such as 210 in FIG. 2, can generate the β values based on a logarithm relationship at which one or more exchange curves can be evaluated. Exchange curves can be generated by the IA module using equally spaced intervals of the intermediate parameter called β. In this manner, analysis of the exchange curves by a user can be enhanced since the points or data of interest are regularly spaced along the exchange curve.

In other embodiments, an IA module can utilize other methods and/or algorithms, and any combinations thereof to determine an exchange curve with regular spacing of associated points or data of interest along the exchange curve.

Improved methods and/or algorithms can be implemented by an inventory advisor module, such as 210 in FIG. 2, to determine a reorder point which describes the probability of a stockout. Approximate equations can be utilized by an IA module to determine an "optimal" reorder point for a flow path. These approximations can be relatively accurate under certain circumstances, but can induce large inaccuracies when the reorder quantity is low or if the targeted service level is low.

For example, an approximate equation for determining a reorder point can be as follows.

$$FR = 1 - G^1[R]/Q = \text{Probability of Stock Out During Replenishment} \quad (1)$$

where Q is the reorder quantity, R is the reorder point (being solved for), and $G^1$ is the first order loss function for the assumed lead time demand distribution, and FR is the desired fill rate.

Assuming a normal distribution, a reorder point, such as an "optimal" reorder point R, can be solved from the following expression.

$$G(Z_R) = \frac{\beta D}{\beta D + HCQ} \quad (2)$$

where $Z_R$ is the standard normal variate of the assumed distribution evaluated at R. For any given R, one can determine $Z_R$ from the originally assumed distribution by taking $Z_R = (R-\mu)/\sigma$ where μ is the mean of the original distribution and σ is the standard deviation of the original distribution. To solve equation (1), the inverse of the standard normal distribution at βD/(βD+HCQ) is determined. This value describes the optimal fill rate target given when B represents the cost of backorders, H represents the holding cost rate and C represents the unit cost of the item in question. As before, D represents the demand rate for the product and Q represents the reorder quantity of the product. Note that the approximate equation may not be accurate for smaller values of Q, or when the target service level is low. Thus, an exact equation for determining a reorder point can be solved as follows.

$$FR = 1 - \frac{\sigma}{Q}\{G^1(Z_R) - G^1(Z_{R+Q})\} \quad (3)$$

If Q is relatively large, then the equation result is close to the results of equation (1).

The IA module can implement and solve equation (3) using, for example, Ridder's method. An example for solving an exact equation using Ridder's method is shown in Chapter 9, Section 9.2 of "Numerical Recipe's in C: The Art of Scientific Computing," ISBN: 0-521-43108-5, Cambridge University Press, 1988-1992. Ridder's method is an algorithm for finding the zero of a function assuming one can bracket the parameter space where the zero occurs.

In other embodiments, an IA module can utilize other methods and/or algorithms, and any combinations thereof to determine a reorder point for a particular flow path.

Systems and Methods for Integrating Functionality of LWE Module and IA Module

Embodiments of the present invention can provide improvements in a LWE module and IA module. Embodiments of the present invention can provide methods and systems for coordinating a lot size optimization decision and an inventory optimization decision so that the optimal lot size can be considered in both the impact on cycle time and the expected impact on inventory carrying cost. Embodiments of the present invention can improve single echelon analysis to permit a user to determine appropriate lead time distributions for products based in part on at least an output of a LWE module, such as 216 in FIG. 2. Furthermore, embodiments of the present invention can improve single echelon analysis to accept one or more constraints on allowed reorder quantities from a lot size optimization, such as the process described above with respect to the LWE module 216. In this manner, reorder quantities for products, when set as a multiple of an efficient lot size, can be consistent with policies which can support efficient production. Straying from these settings can risk increasing the mean and variance of an observed replenishment lead time for a product. In addition, replenishment lead times or cycle-times provided by a LWE module can provide an improved estimate of a replenishment lead time for a product. Furthermore, an estimate of the lead time distribution can account for an expected demand on a system versus a capacity of the system. At times of peak demand, lead times may increase exponentially if the system is capacity constrained. In such situations, longer lead times may need to be reflected or otherwise represented in the input used for single echelon inventory analysis.

Figure 13:
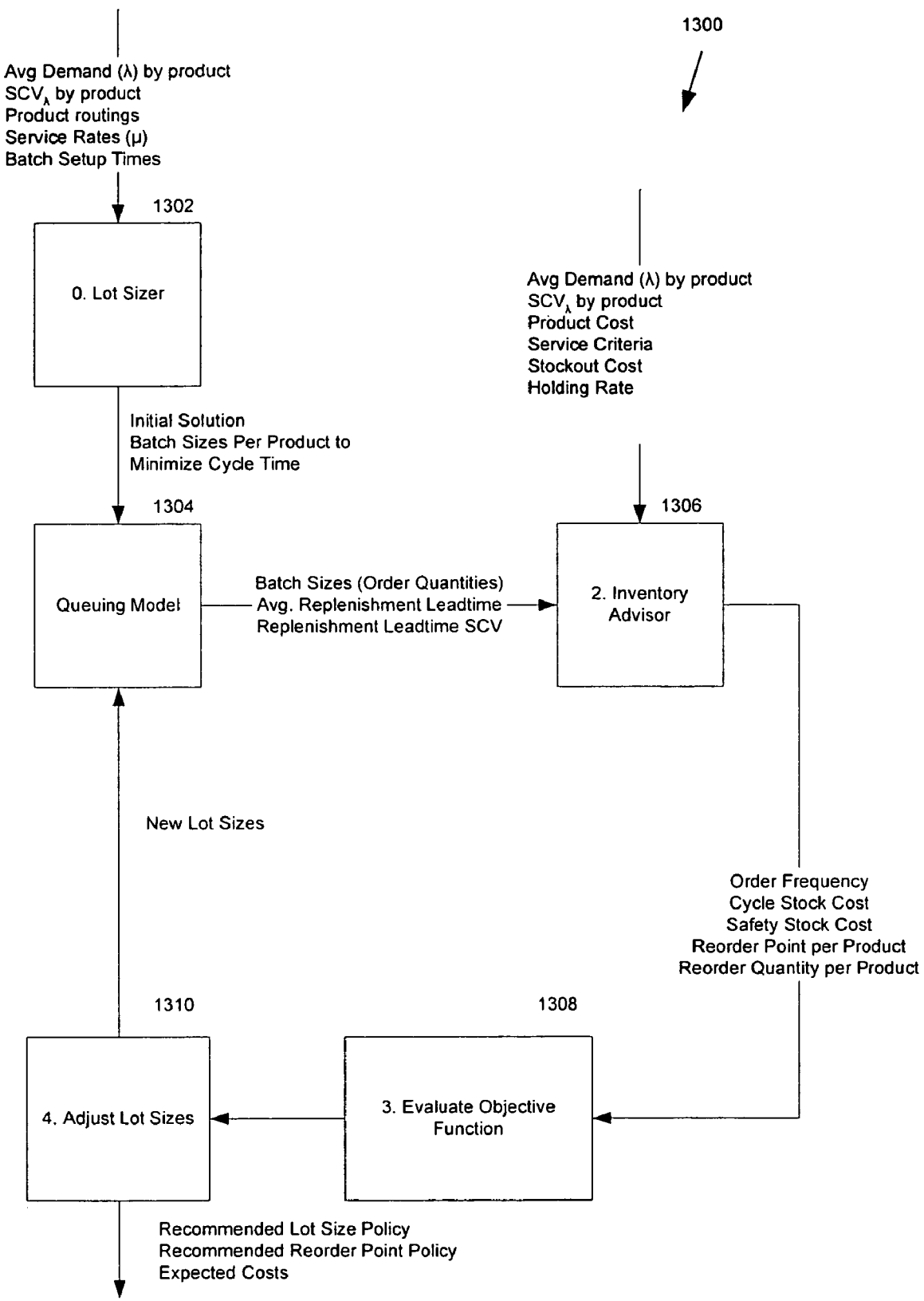
FIG. 13 is a flowchart of another method according to various embodiments of the invention.
Figure 14:
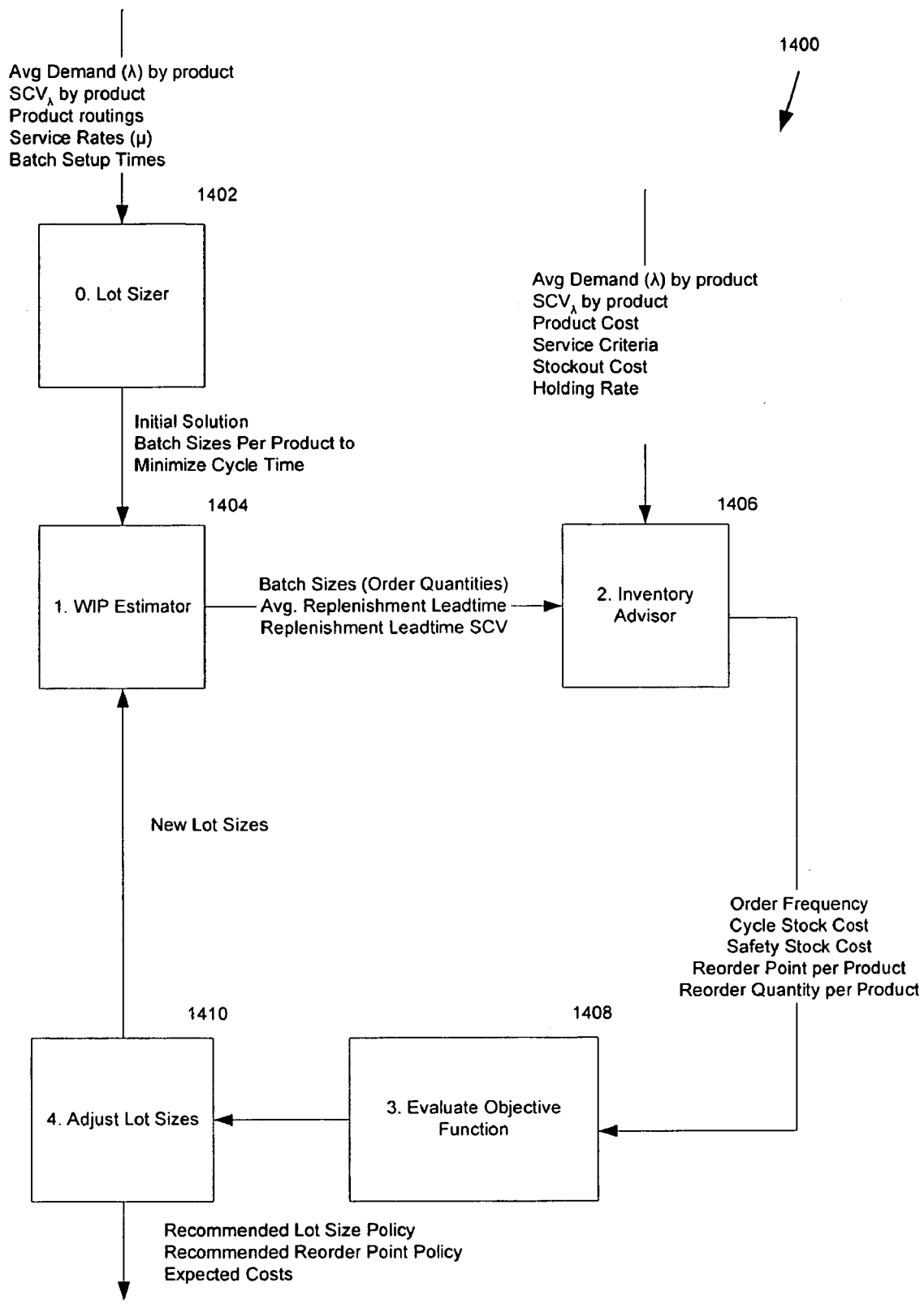
FIG. 14 is a flowchart of another method according to various embodiments of the invention.

FIGS. 13 and 14 illustrate example methods 1300, 1400 in accordance with embodiments of the invention. The methods 1300, 1400 can represent iterative solutions which can provide feedback from a single echelon inventory analysis to adjust one or more constraints on associated lot sizes of items in the respective flow paths or systems. Other embodiments of methods similar to those in FIGS. 13 and 14 can include fewer or greater steps than described below In FIG. 13, the method 1300 begins at block 1302.

In block 1302, a lot sizer module can receive or more inputs associated with an item in a flow path. A lot sizer module, such as block 216 in FIG. 2, can receive one or more inputs associated with, among other things, corresponding product demands, product routings, set up times and service rates. Based in part on at least some or all of these inputs, the lot sizer module 216 can determine a set of optimal lot sizes that can minimize the average cycle time through the flow path or system. The output or solution from the lot sizer module 216 can used as an input for block 1304.

Block 1302 is followed by block 1304, in which a WIP estimator module can receive an input of one or more lot sizes. An example of a WIP estimator module is shown as block 216 in FIG. 2. The input can be from either the output of the lot sizer module 216 described with respect to block 1302, or as the output of an adjusted lot size process from block 1310. The use of an output from the lot sizer module 216 as an input for block 1304 can result in relatively rapid convergence of the overall process than if an arbitrary set of policies was used as input for block 1304. In this embodiment, the WIP estimator can implement a queuing model to determine an estimate replenishment lead time and lead time variance. In other embodiments, other models, algorithms and/or techniques can be implemented by a WIP estimator. In either instance, an improved estimate of a replenishment lead time and lead time variance for each product under consideration can be obtained. The output from block 1302 can be used as input to block 1306.

Block 1304 is followed by block 1306, in which an inventory advisor (IA) module can receive an input associated with a supply process, such as replenishment lead time and replenishment lead time variance, and a demand process, such as mean and standard deviation, for a product under consideration. An example of an IA module is shown as block 210 in FIG. 2. The IA module can also receive additional input such as holding costs, stockout penalty costs, or a service rate target. Based at least in part on some or all of the inputs, the IA module 210 can determine a required inventory level to either meet a predefined service target or minimize inventory holding costs. The output from block 1306 can be used as input to block 1308.

Block 1306 is followed by block 1308, in which the inventory advisor (IA) module or another module can evaluate an objective function. An objective function is an algorithm, technique, or mathematical expression which can provide a scalar score for a recommended lot size and reorder point policy. Embodiments of an objective function can be based at least in part on data provided by a user, or a sum of the expected monetary costs resulting from the lot size and inventory policy. For example, an IA module 210 can determine a score for a recommended lot size and reorder point policy from an objective function using data provided by a user and/or a sum of the expected monetary costs resulting from the lot size and inventory policy. The score assigned by the block 1308 is used as input to block 1310.

Block 1308 is followed by block 1310, in which the inventory advisor (IA) module or another module can adjust one or more lot sizes. For example, an IA module 210 can compare the score of the current solution with one or more previously determined solutions, and can evaluate whether the current solution is optimal. If a determination is made that the current solution is optimal, a current policy can be generated and returned as the recommended policy. If a determination is made that the current solution is less than or not optimal, the IA module 210, for example, can hypothesize a new set of lot size policies that may provide improved performance. The new set of policies can then be provided as input for evaluation to block 1302. New policies can include, but are not limited to, a recommended lot size, recommended reorder point, and expected costs. The IA module 210, for instance, can implement a derivative free non-linear optimization method such as the adaptation of Powell's method described above. In this instance, the function evaluation needed to support the conjugant gradient search can be a combination of activities that occur at blocks 1304, 1306, and 1308.

The method 1300 ends at block 1310.

The method 1400 shown in FIG. 14 illustrates another embodiment of the present invention using discrete event simulation. In this example, discrete event simulation can be implemented by the WIP estimator module, such as 216 in FIG. 2. Discrete event simulation can provide improved accuracy over a queuing model such as described in FIG. 13, however, a queuing model can derive estimates of the replenishment lead time and the variance of the replenishment lead time with greater speed. The decision of implementing either model can depend on the relative size of the flow path or system being analyzed and the time available to a user.

The method 1400 begins at block 1402.

Similar to the processes described in blocks 1302, 1304, 1306, 1308, and 1310, a series of processes can be implemented in blocks 1404, 1406, 1408, 1408, 1410. The difference in FIG. 14 is that discrete event simulation can be implemented in block 1404 rather than a queuing model described in block 1304 in FIG. 13.

Figure 15A:
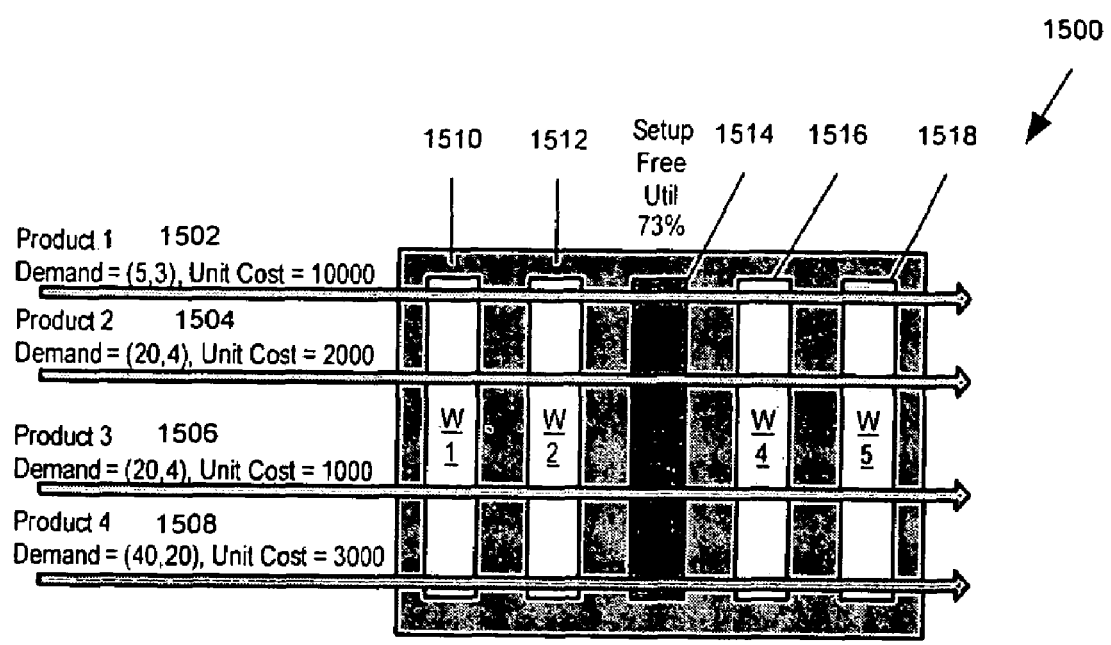
FIG. 15A is a schematic of a flow path for a method according to various embodiments of the invention.

FIG. 15A illustrates an example flow path 1500 or system to implement the above methods in accordance with an embodiment of the invention. In this example, a structure and basic parameters of a five machine, four product flow path or system is shown. Each product 1502, 1504, 1506, 1508 can moves across a series of machines or workstations 1510, 1512, 1514, 1516, 1518, in which the machines or workstations 1510, 1512, 1514, 1516, 1518 can each provide a respective manufacturing and/or finishing process to the products. In this example, setup parameters at workstation 3 1514 are designated to have an actual monetary cost due to the generation of scrap. The cost in this example is taken to be a fraction of the unit cost of the product involved in order to model the case where the cost is the result of generated scrap.

Figure 15B:
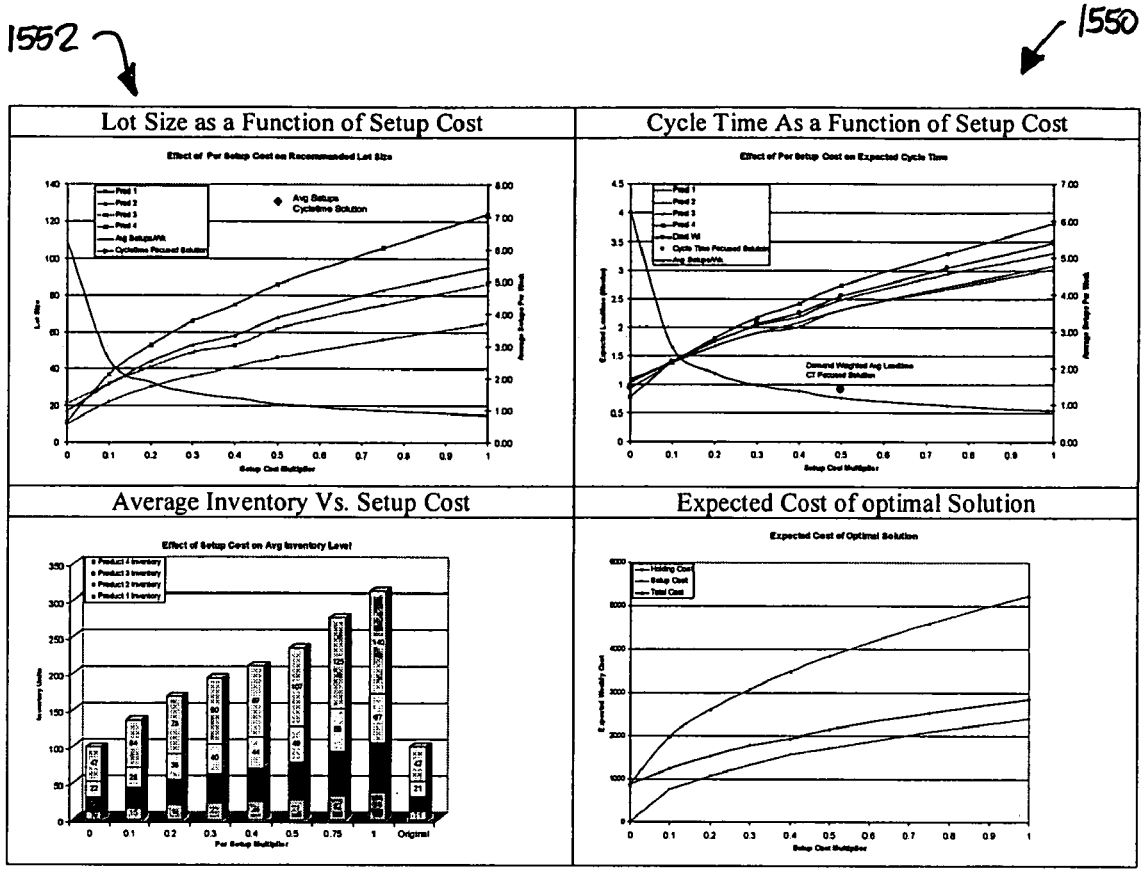
FIG. 15B is a schematic of a flow path for a method according to various embodiments of the invention.

FIG. 15B illustrates a series of user interfaces 1550 for items or products in a flow path, for example, as shown in FIG. 15A. In these example user interfaces 1550, a series of 'optimal' solutions were obtained as the cost of the setup at workstation 3 1514 was increased, and as all other costs were held constant. In other embodiments, other optimal solutions can be provided across a wide range of different conditions. Generally, the results of a trial, such as the solutions in FIG. 15B, can provide a desired pattern of behavior for a user to obtain from a flow path or system. By way of example, as shown in user interface 1552, as the cost of setups increases, the flow path or system may be driven to relatively larger lot sizes and the expected number of setups per week may drop rapidly. When the cost of a setup is approximately zero, the expected number of setups generated with the inventory based objective function can be very close (for instance, 6.3 versus 7.5) to that generated by a current cycle-time focused objective function. With no setup costs, the cycle-time based solution can produce a slightly better expected cycle-time and the inventory based solution can produce a slightly lower expected inventory level. In addition, other trends can be expected, such as when the setup cost increases, lot sizes of corresponding products increase. With an increase in lot size, an increase in replenishment lead times can result, in addition to an increase in the reorder point for the products. Other user interfaces can be generated in accordance with various embodiments of the invention.

Systems and Methods for Implementing Multi-Echelon Inventory Analysis

Embodiments of the present invention can be implemented to perform multi-echelon inventory analysis, and to optimize a multi-echelon system. In one embodiment of the invention, a multi-echelon inventory advisor (MEIA) module such as 210A can perform multi-echelon inventory analysis or optimize a multi-echelon system. As shown in FIG. 2, a multi-echelon inventory advisor (MEIA) module 210A can operate in conjunction with, either or both, an IA module and LWE module, such as 210 and 216 respectively. Methods and/or algorithms associated with a MEIA module 210A can be implemented by a system, such as 100 shown in FIG. 1. A MEIA module, such as 210A, can provide various functionality including, but not limited to, performing multi-echelon inventory analysis, optimizing a multi-echelon inventory system, determining recommended inventory levels at intermediate points in a user's manufacturing operation, determining recommended inventory levels for raw materials in a user's manufacturing system, determining recommended inventory levels for stocking locations such as warehouses and distribution centers that may be outside of the manufacturing system but inside the supply chain, accounting for production lead times, determining constraints on production quantities, and analyzing and utilizing user supplied targets for finished goods service levels or guaranteed lead times to customer orders. A MEIA module such as 210A can also provide or otherwise output one or more inventory recommendations to implement inventory decisions, such as meeting required levels of service at the lowest cost given a particular set of system constraints and characteristics described by a user.

Figure 17:
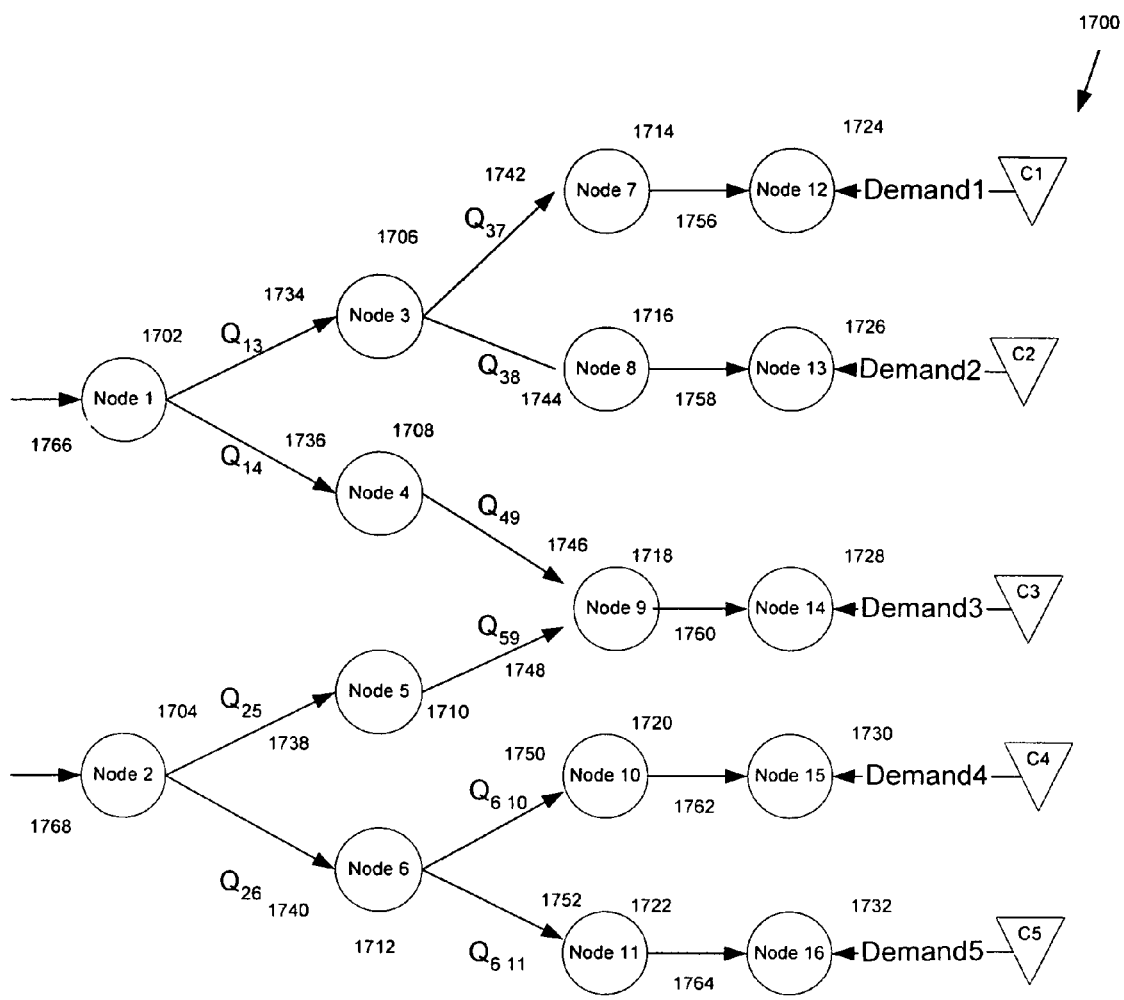
FIG. 17 illustrates a schematic of an inventory management relationship in a supply chain network according to various embodiments of the invention.

FIG. 17 illustrates inventory management relationships in a relatively small supply chain network 1700. In this Figure, the circles 1702-1732 labeled "node", i.e., nodes 1-17, each represent storage of a specific material at a specific location. The arcs 1734-1764 in the Figure each represent material relationships that may be required for various material transformations performed in the supply chain network 1700. As example, the label "$Q_{25}$" on the arc 1738 between node 2 1704 and Node 5 1710 can represent a quantity of material stored at the location of node 2 1704 to create a single unit of the material stored at Node 5 1710. In the case of Node 9 1718, ingredient materials may be required both from Node 4 1708 and Node 5 1710 to produce the material stored at Node 9 1718. This is termed an "assembly relationship." Several of the arcs 1754-1764 in FIG. 18 are not labeled, indicating that the transition between the corresponding nodes represents a transportation (same material moved to a different location) rather than a transformation of the respective material.

Also associated with each arc 1734-1764 in the network 1700 is a description of the delay associated with the transformation or transportation activity. This schematic can represent a delay associated with an activity itself. In practice, additional delays may be generated for the replenishment activity at a node if the ingredient materials required for the activity are not immediately available. For example, Node 1 1702 and Node 2 1704 can represent raw materials for the supply chain network. These are materials that may be obtained from an exogenous source. As with the other nodes in the network 1700, a delay 1764, 1766 can be associated with the replenishment activities for these nodes 1702, 1704. However, as the source of the material for the replenishment activity is external to the system or network 1700, in practice, the only delay associated with such replenishment activity is the one associated with these arcs 1766, 1768 in the supply chain network 1700.

Figure 18:
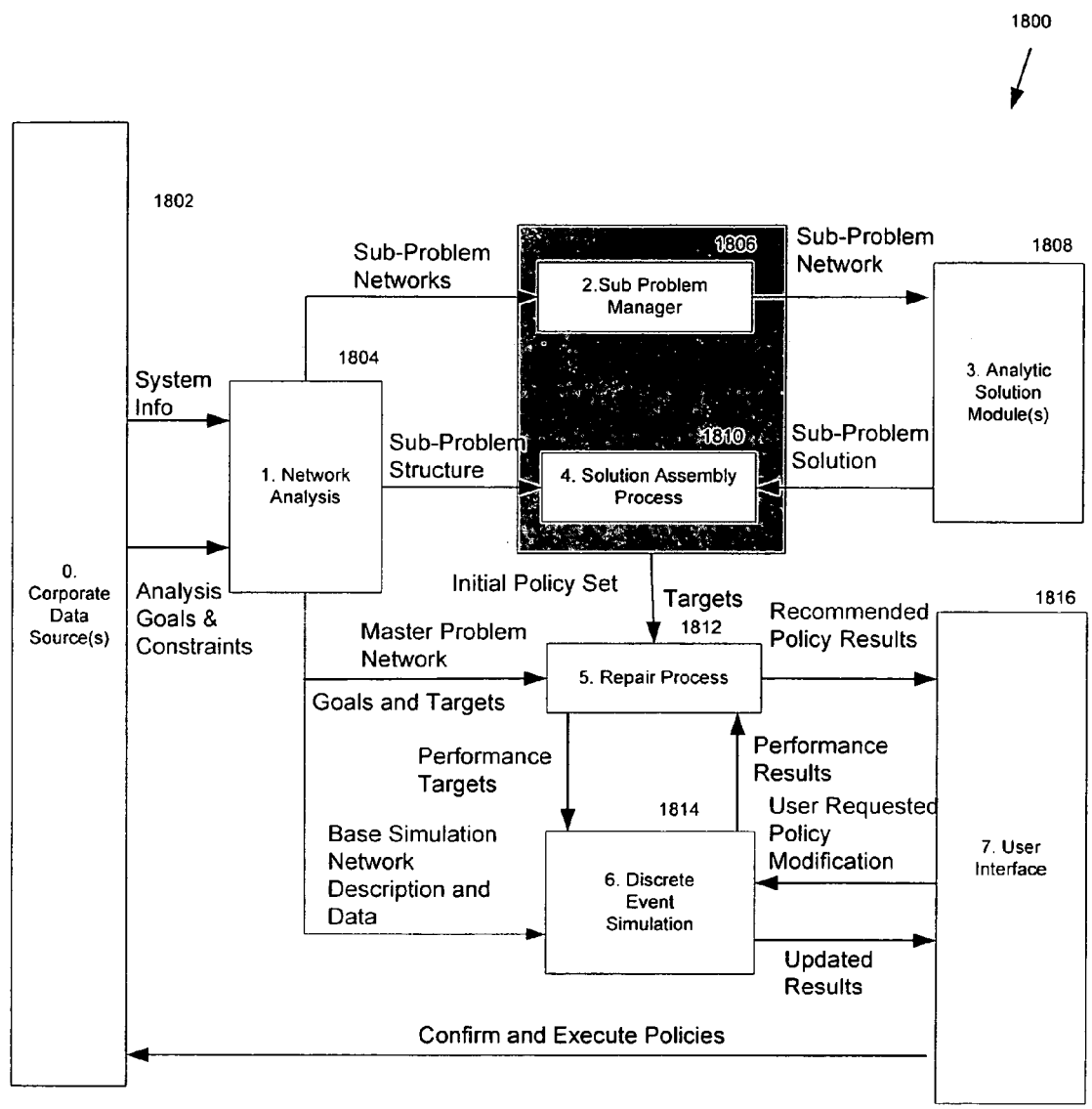
FIG. 18 is a functional block diagram of a system and method according to various embodiments of the invention.

FIG. 18 illustrates a method for optimizing a multi-echelon inventory system in a supply chain according to various embodiments of the invention. One embodiment of the method described in FIG. 18 can be implemented using a set of computer-executable instructions or computer program with sub-routines that belong to a monolithic program, or a set of computer-implemented processes which can run independently and communicate through conventional message and data passing. Other embodiments of a method for performing multi-echelon inventory analysis can include fewer or greater steps than described below.

The method 1800 begins at block 1802. In block 1802, one or more pre-existing corporate information systems can provide inventory data to a MEIA module, such as 210A in FIG. 2. In this example, inventory data can be associated with a flow path, system, supply chain, or supply chain network of interest. Corporate information systems can include, but are not limited to, an ERP system, a MRP system, a forecasting system, a CRM system, a database system, or a combination of some or all of the above. Such systems can provide a source of inventory data needed for a multi-echelon inventory system analysis. Various methods and/or devices can be utilized for extracting and combining inventory data from one or more data sources.

Figure 16:
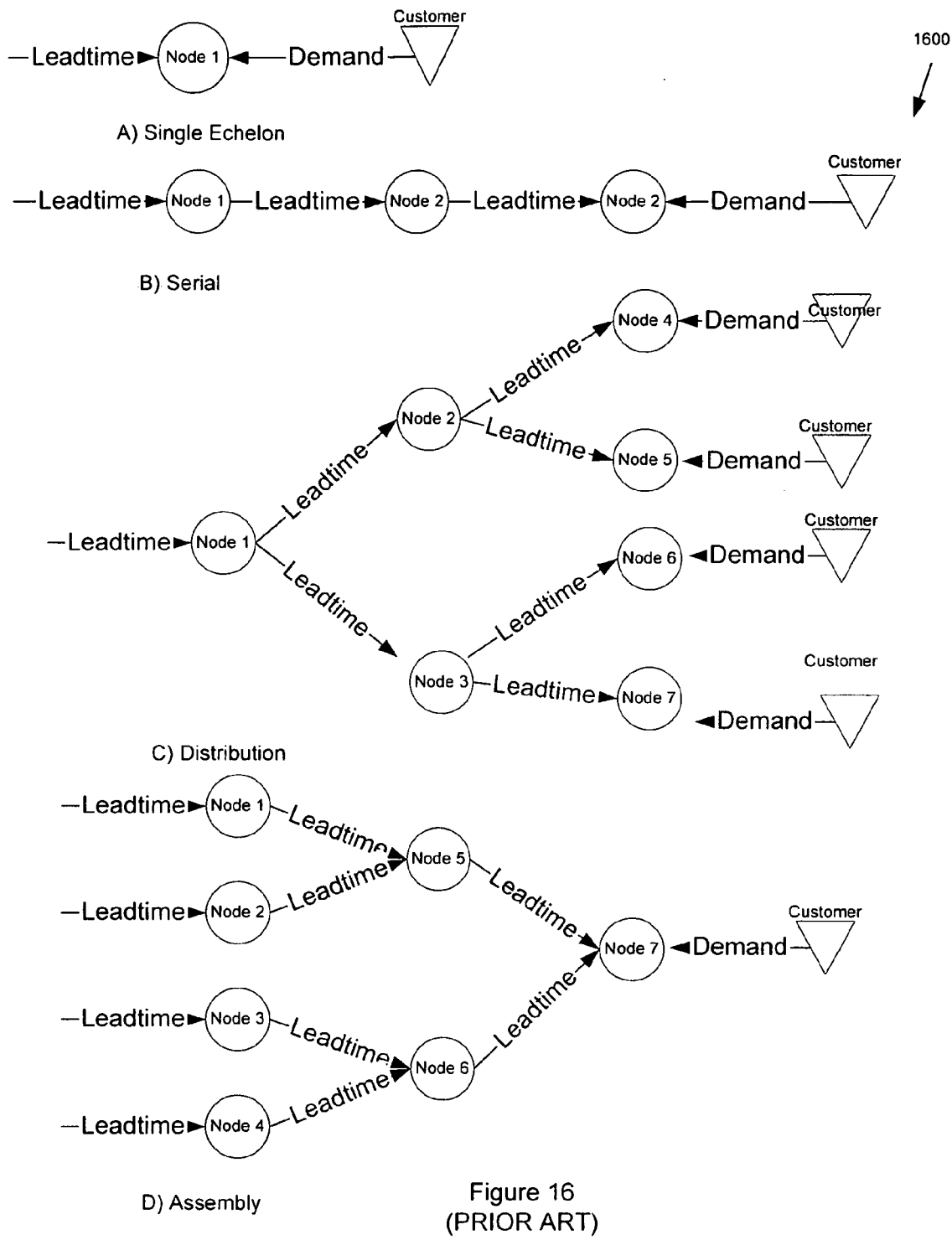
FIG. 16 illustrates a schematic of a conventional inventory management relationship in a supply chain network.

Block 1802 is followed by block 1804, in which a supply chain network is analyzed. In this example, a MEIA module 210A can convert inventory data received from or otherwise obtained from one or more corporate information systems into a suitable data structure or other representation of the data, such as a "graph" type data structure. For instance, inventory data from a corporate database can be converted to a data structure with an associated topology or schematic, similar to 1600, 1700 in FIGS. 16 and 17, representing a supply chain network of interest. The data conversion can include a data structuring process which generates a problem description, such as a description of an overall master problem, associated with the supply chain network. In addition, the data conversion can include the generation of a set of one or more sub-problems. Each sub-problem can be a supply chain sub-network with a topology or schematic similar to 1600, 1700 in FIGS. 16 and 17.

Block 1804 is followed by blocks 1806, in which one or more sub-problems are stored and managed. For example, a MEIA module, such as 210A, can include a sub-problem manager processing component or associated memory to administer, store, and handle information associated with one or more sub-problems associated with a supply chain network of interest. In this example, each sub-problem can be stored in a data structure such as a data file or "graph"-type data structure representing a description of a supply chain network, similar to the topology or schematic 1600, 1700 in FIGS. 16 and 17.

Block 1806 is followed by block 1808, in which at least one sub-problem is analyzed using at least one solution technique. A solution technique can include, but is not limited to, dynamic programming, stochastic inventory theory, mixed integer programming, a similar type of solution theory or analysis, or any combination thereof. In this example, data associated with each sub-problem, such as a series of nodes similar to 1702-1732 as described in FIG. 17, and the associated relationships or connectivity of the nodes similar to the topology or schematic 1700 shown in FIG. 17, can be transformed from data in the overall master problem to facilitate an analysis using a solution technique. In this example, every node in the supply chain network can be represented in at least one of the sub-problems. The MEIA module 210A can utilize a particular solution technique suitable for each sub-problem to determine a solution for each sub-problem that is optimal with respect to assumptions which may be inherent in the solution technique. For instance, stochastic inventory theory and dynamic programming can be utilized as solution techniques for pure assembly and pure distribution-type topologies or schematics, and may include the use of mixed integer programming or other operations research techniques if one or more assumptions require or warrant their use. The MEIA module 210A can generate a set of one or more policies associated with each node in a sub-problem and a set of expected performance statistics for each of the nodes in the sub-problem. In this manner, each sub-problem can be processed using a respective solution technique until all of the sub-problems have a completed solution.

Block 1808 is followed by block 1810, in which an overall solution is assembled. In this example, a MEIA module such as 210A can receive input of a set of sub-problems generated from block 1804, and a respective solution including one or more policies and expected performance statistics for each sub-problem from block 1808. In some instances, nodes may be present in more than one sub-problem. In this instance, parameters may be combined for respective solutions generated for each sub-problem. The performance expectations at the nodes in question may then be adjusted as needed. The MEIA module 210A can combine or otherwise assemble the solutions and corresponding policies and expected performance statistics into an overall solution or initial policy set comprising one or more policies with one or more performance targets for the supply chain network of interest.

Block 1810 is followed by block 1812, in which an overall solution is received and repaired or modified as needed. For example, a MEIA module such as 210A can receive an overall solution comprising a supply chain network description and an objective function and performance goals from block 1804, and a set of inventory policies and expected performance statistics from block 1810.

Block 1812 is followed by block 1814, in which an iterative analysis is performed on the supply chain network to evaluate the set of inventory policies. In this example, the MEIA module such as 210A can perform an iterative analysis, such as discrete event simulation, to analyze the supply chain network and evaluate the set of inventory policies. The MEIA module 210A can includes a discrete event simulation engine programmed with an appropriate model capable of describing the behavior of a supply chain network. Iterative analysis, such as discrete event simulation, can provide a more accurate estimate of supply chain network or system performance, particularly when the characteristics of the supply chain network or system being evaluated depart from some or all assumptions common in other conventional analysis.

After each iteration at block 1814, the MEIA module 210A can return to block 1812 as needed to update or otherwise modify the set of inventory policies set based at least in part on the results of the analysis or simulation. For example, inventory policies can be adjusted based on the relative policy performance measured by the simulation at a node with respect to the performance expected from the analytical solution and/or constraints on performance at the node. The repair or modification process can account for the stochastic nature of the simulation (the same policy may yield different measured results in different runs of the simulation) and can also account for the sequence in which the policies for individual nodes are manipulated. In this manner, the initial set of policies can be repaired or otherwise modified until the performance measured at each of the nodes with specific performance constraints within a specified tolerance, thereby generating a relatively lower cost solution.

In one embodiment, a performance constraint can be a target level of performance mandated by or otherwise defined by a user at the start of the process. In some instances, nodes in the supply chain network of interest may not have any mandated performance constraints.

When the iterative analysis is sufficiently complete to provide a repaired or modified result, the method 1800 continues at block 1816. In block 1816, a user interface can be provided to permit a user to review expected performance results and costs of the recommended inventory policies. For example, a MEIA module such as 210A can provide a user interface to permit user to review of detailed performance statistics on each component of the supply chain network, to review recommended policy settings for each component of the supply chain network, to review recommended modifications to the recommended policy settings, and to confirm and commit selected inventory policies to a corporate information system for execution. If the user recommends modifications to a policy set suggested by the method 1700, the modified policy set can be evaluated by discrete event simulation or other analysis techniques, and the results can be re-presented to the user for review and possible further modification through the user interface.

The method 1800 ends at block 1816.

Systems and Methods for Partitioning Planning Information of the present invention can provide systems and methods for partitioning planning information. Such methods and/or algorithms can be implemented by a system, such as 100 shown in FIG. 1. In one embodiment, an inventory advisor (IA) module, such as 210 in FIG. 2, can implement methods for partitioning planning information. Planning information can include, but is not limited to, inventory information, process planning information, product information, demand information, supply information, scheduling information, and information associated with planning. In one embodiment, a user via a user interface can assign entities, such as products or route steps, to particular groups of interest, such as flow paths or control loops. In this manner, a user can partition planning associated information such as multiple types or quantities of products into differentiated flow paths, and partition various route steps into different control loops. In other embodiments, a user can uniquely assign any number of entities to any number of groups of interest sufficient to support any partitioning task in accordance with the invention.

Figure 19:
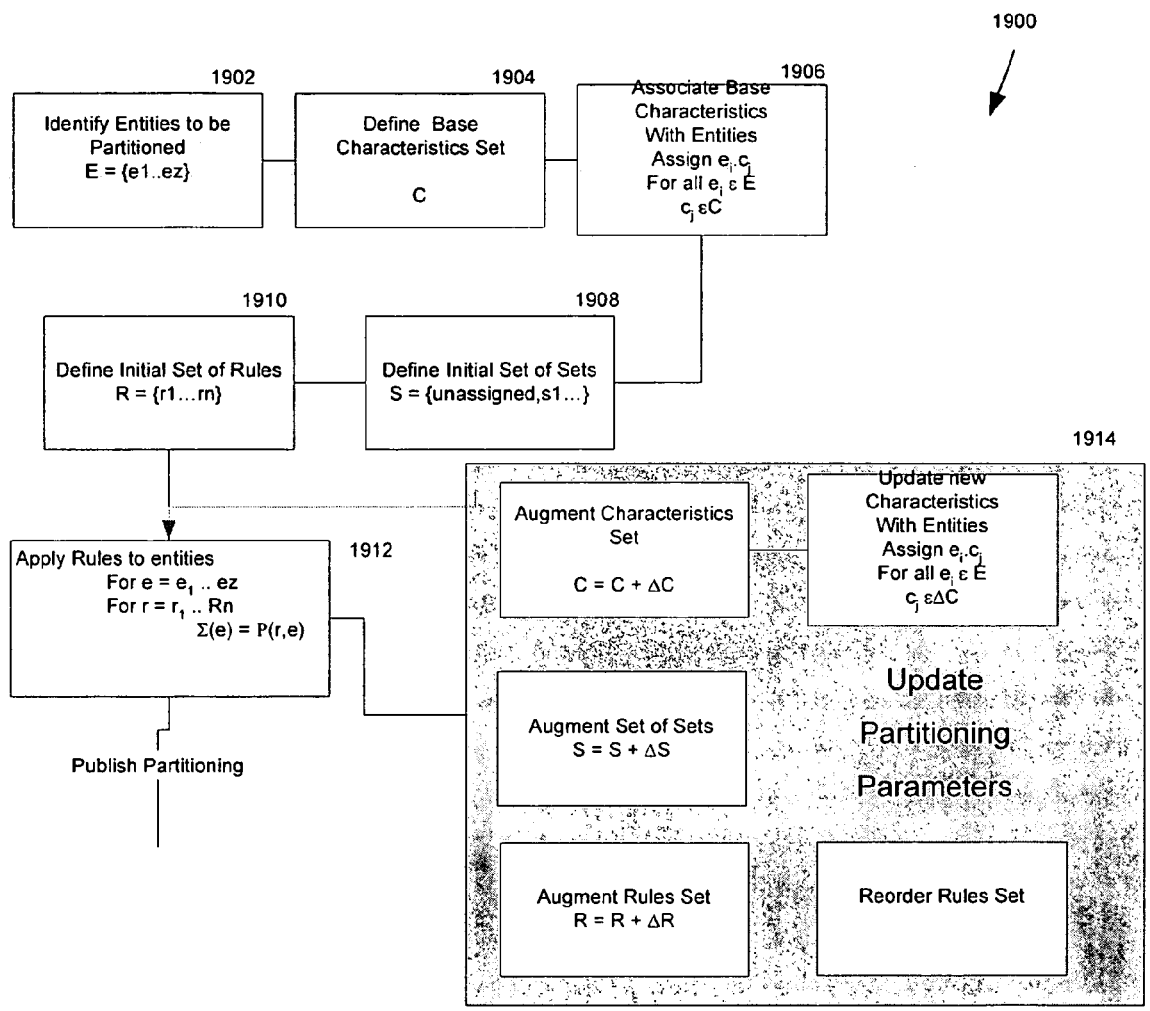
FIG. 19 is a flowchart of another method according to various embodiments of the invention.

FIG. 19 illustrates a method 1900 for partitioning planning information in accordance with an embodiment of the invention. Other embodiments of a method for partitioning planning information can include fewer or greater steps than described below.

The method 1900 begins at block 1902. In block 1902, entities to be partitioned are identified. Entities can include planning information as described above. For example, an IA module such as 210 in FIG. 2 can define a population of planning information, E, as a set of entities to be partitioned, $E=\{e_1 \ldots e_n\}$.

Block 1902 is followed by block 1904, in which a base characteristics set is defined. For example, an IA module such as 210 in FIG. 2 can define a population of characteristics, C, as a set of characteristics associated with some or all entities, $C=\{\Sigma, c_1 \ldots c_x\}$.

Block 1904 is followed by block 1906, in which base characteristics are associated with some or all respective entities. For example, an IA module such as 210 in FIG. 2 can evaluate which entities possess particular characteristics. If a particular entity has one or more characteristics, then those characteristics can be associated with the particular entity.

Block 1906 is followed by block 1908, in which an initial set of groups is defined. For example, an IA module such as 210 in FIG. 2 can define S as a set of groups to which entities are partitioned, $S=\{unassigned, \ldots s_z\}$. In some instances, one member s in set S can be a default or called "unassigned."

Block 1908 is followed by block 1910, in which an initial set of rules is defined. For example, an IA module such as 210 in FIG. 2 can define R as an ordered set of rules, $r \in R$: $E \times C \rightarrow s \in S$; wherein $R=\{r_1 \ldots r_y\}$.

Block 1910 is followed by block 1912, in which rules are applied to the entities. For example, an IA module such as 210 in FIG. 2 can define $P(r,e)$ as a mapping function that applies rule r to the characteristics of entity e and returns a value $s \in S$. In one embodiment, the rules can be ordered or prioritized, and can be applied to the entities in E according to their ordering or priority. In this manner, for example, a rule $r_j \in R$ may override the assignment made by $r_i \in R$, if the index of $r_j$ has a value is greater than the value of index $r_i$.

Block 1912 is followed by block 1914, in which one or more partitioning parameters are updated. Updates to partitioning parameters can include, but are not limited to, augmenting a characteristics set, augmenting a set of groups, augmenting a rules set, assigning new characteristics with respective entities, and reordering a rules set.

In one embodiment, the method can be implemented iteratively. At the end of each iteration, each entity is assigned to exactly one set s in S. At the start of an iteration, a user can repeat some or all of the steps in blocks 1902 through 1912 to refine the partitioning process. Examples of refining the partitioning process can include, but are not limited to, adding other characteristics to evaluate, adding other sets that can be assigned to, and creating rules for mapping E×C→S. In this manner, the user can incrementally refine some or all partitioning of the entities.

In block 1914, the method 1900 ends.

Figure 20:
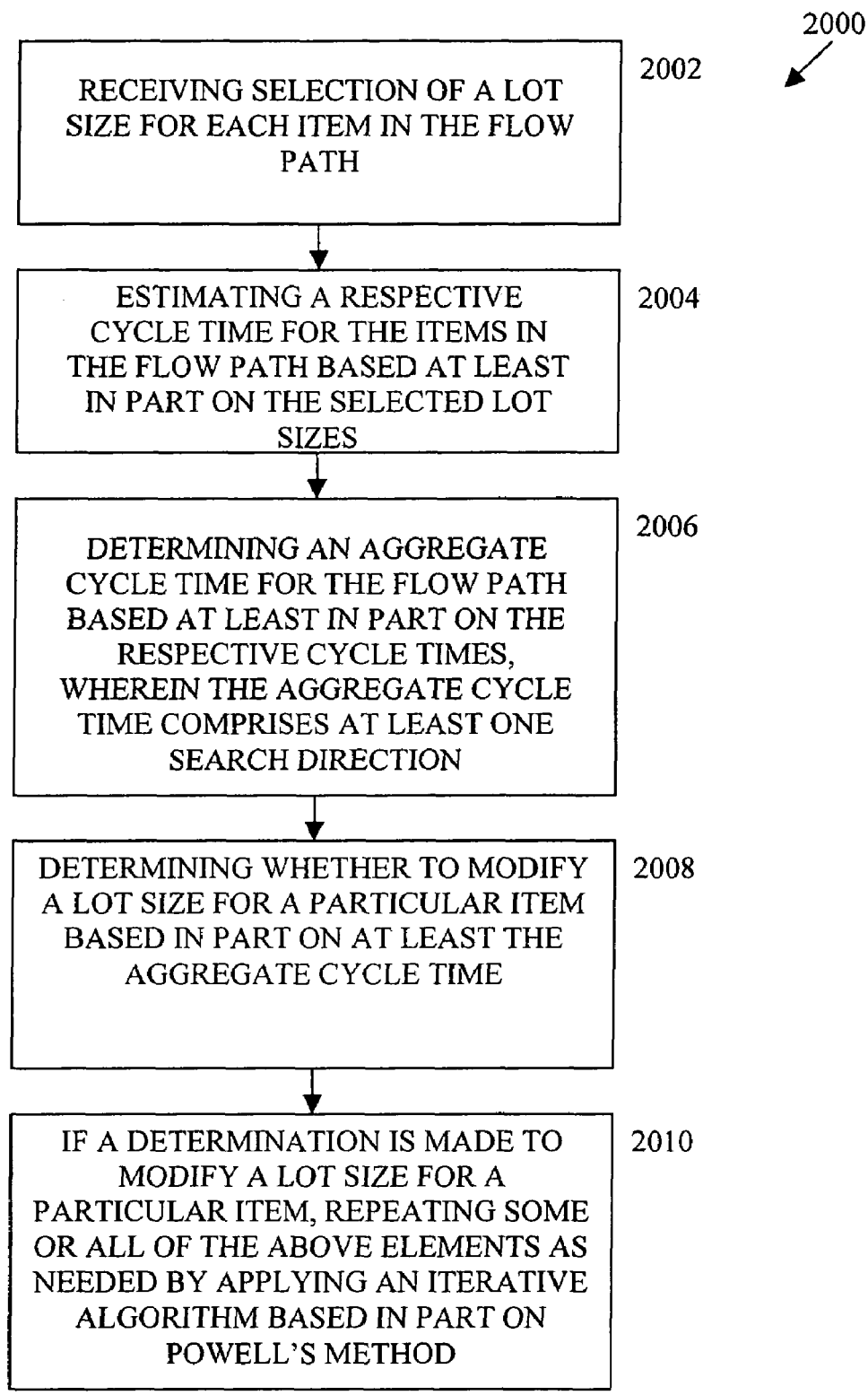
FIG. 20 illustrates a method according to various embodiments of the invention.

FIG. 20 illustrates a flowchart of a method for determining an optimal lot size for multiple items in a flow path. The method 2000 begins at block 2002.

In block 2002, a selection of a lot size is received for each item in the flow path. In this example, a lot sizer module such as 216 can receive a selection of a lot size for each item in the flow path.

Block 2002 is followed by block 2004, in which based at least in part on the selected lot sizes, a respective cycle time is estimated for the items in the flow path. In this example, a lot sizer module such as 216 can estimate a respective cycle time for the items in the flow path based at least in part on the selected lot sizes.

Block 2004 is followed by block 2006, in which based at least in part on the respective cycle times, an aggregate cycle time for the flow path is determined, wherein the aggregate cycle time comprises at least one search direction. In this example, a lot sizer module such as 216 can determine an aggregate cycle time for the flow path based at least in part on the respective cycle times, wherein the aggregate cycle time comprises at least one search direction.

Block 2006 is 2008, in which based in part on at least the aggregate cycle time, a determination is made to modify a lot size for a particular item to optimize the aggregate cycle time. In this example, a lot sizer module such as 216 can determine whether to modify a lot size for a particular item to optimize the aggregate cycle time based in part on at least the aggregate cycle time, a determination is made.

Block 2008 is followed by block 2010, if a determination is made to modify a lot size for a particular item, some or all of the above elements are repeated as needed by applying an iterative algorithm based in part on Powell's method. In this example, a lot sizer module such as 216 can determine if a determination is made to modify a lot size for a particular item, and then some or all of the above elements can be repeated as needed by applying an iterative algorithm based in part on Powell's method.

The method ends at block 2010.

Figure 21:
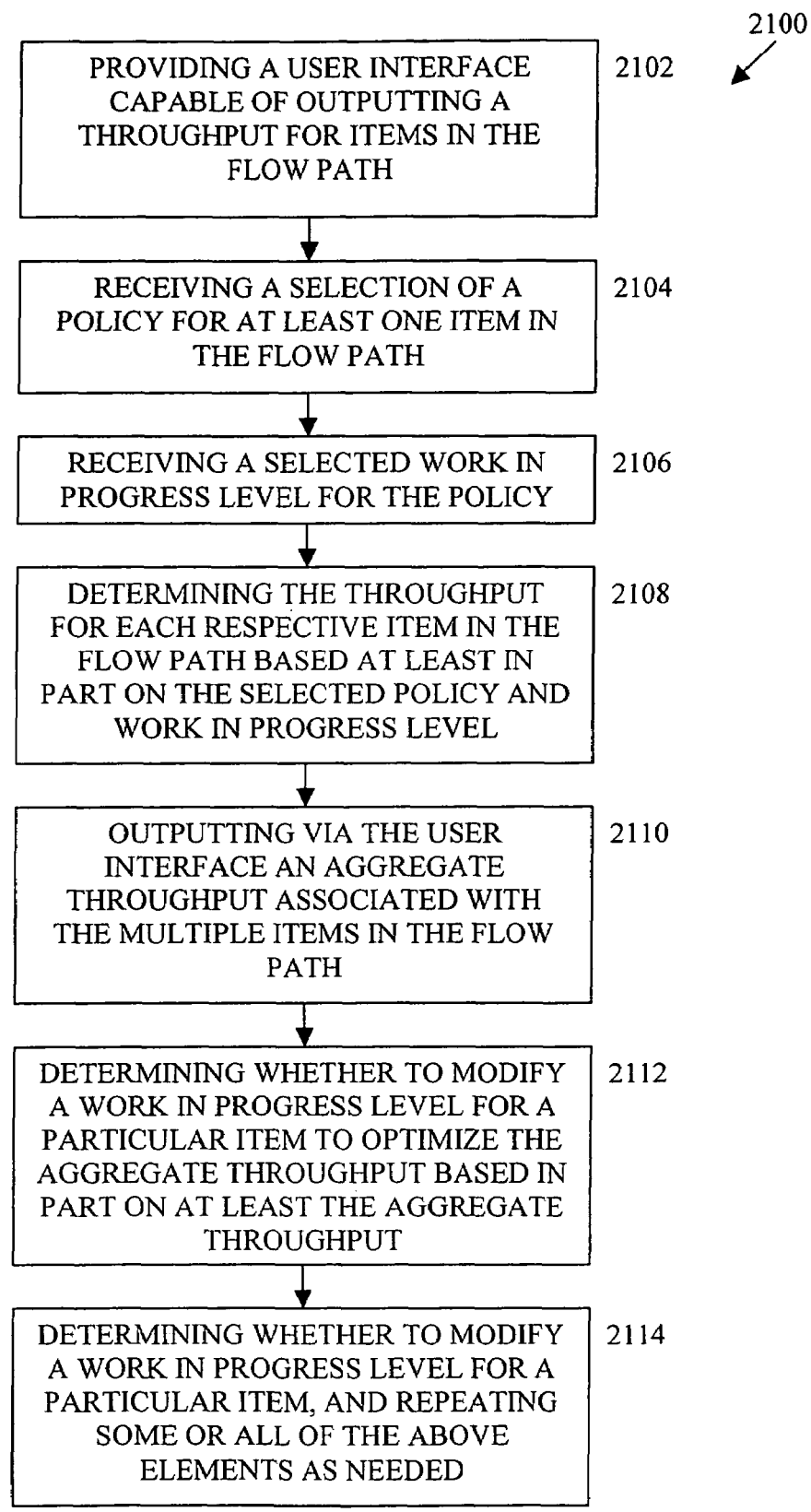
FIG. 21 illustrates a method according to various embodiments of the invention.

FIG. 21 illustrates a method for determining an optimal work in progress level for multiple items in a flow path. The method 2100 begins at block 2102.

In block 2102, a user interface capable of outputting a throughput for items in the flow path is provided. In this example, a WIP estimator module such as 216 can provide a user interface capable of outputting a throughput for items in the flow path.

Block 2102 is followed by block 2104, in which a selection of a policy for at least one item in the flow path is received. In this example, a WIP estimator module such as 216 can receive a selection of a policy for at least one item in the flow path.

Block 2104 is followed by block 2106, in which a selected work in progress level for the policy is received. In this example, a WIP estimator module such as 216 can receive a selected work in progress level for the policy.

Block 2106 is followed by block 2108, in which based at least in part on the selected policy and work in progress level, the throughput is determined for each respective item in the flow path. In this example, a WIP estimator module such as 216 can determine throughput for each respective item in the flow path based at least in part on the selected policy and work in progress level.

Block 2108 is followed by block 2110, in which an aggregate throughput associated with the multiple items in the flow path is output via the user interface. In this example, a WIP estimator module such as 216 can output an aggregate throughput associated with the multiple items in the flow path via the user interface.

Block 2110 is followed by block 2112, in which based in part on at least the aggregate throughput, a determination is made whether to modify a work in progress level for a particular item to optimize the aggregate throughput. In this example, a WIP estimator module such as 216 can determine whether to modify a work in progress level for a particular item to optimize the aggregate throughput based in part on at least the aggregate throughput.

Block 2112 is followed by block 2114, in which if a determination is made to modify a work in progress level for a particular item, some or all of the above elements are repeated as needed. In this example, a WIP estimator module such as 216 can determine whether to modify a work in progress level for a particular item, then repeat some or all of the above elements as needed.

The method 2100 ends at block 2114.

Figure 22:
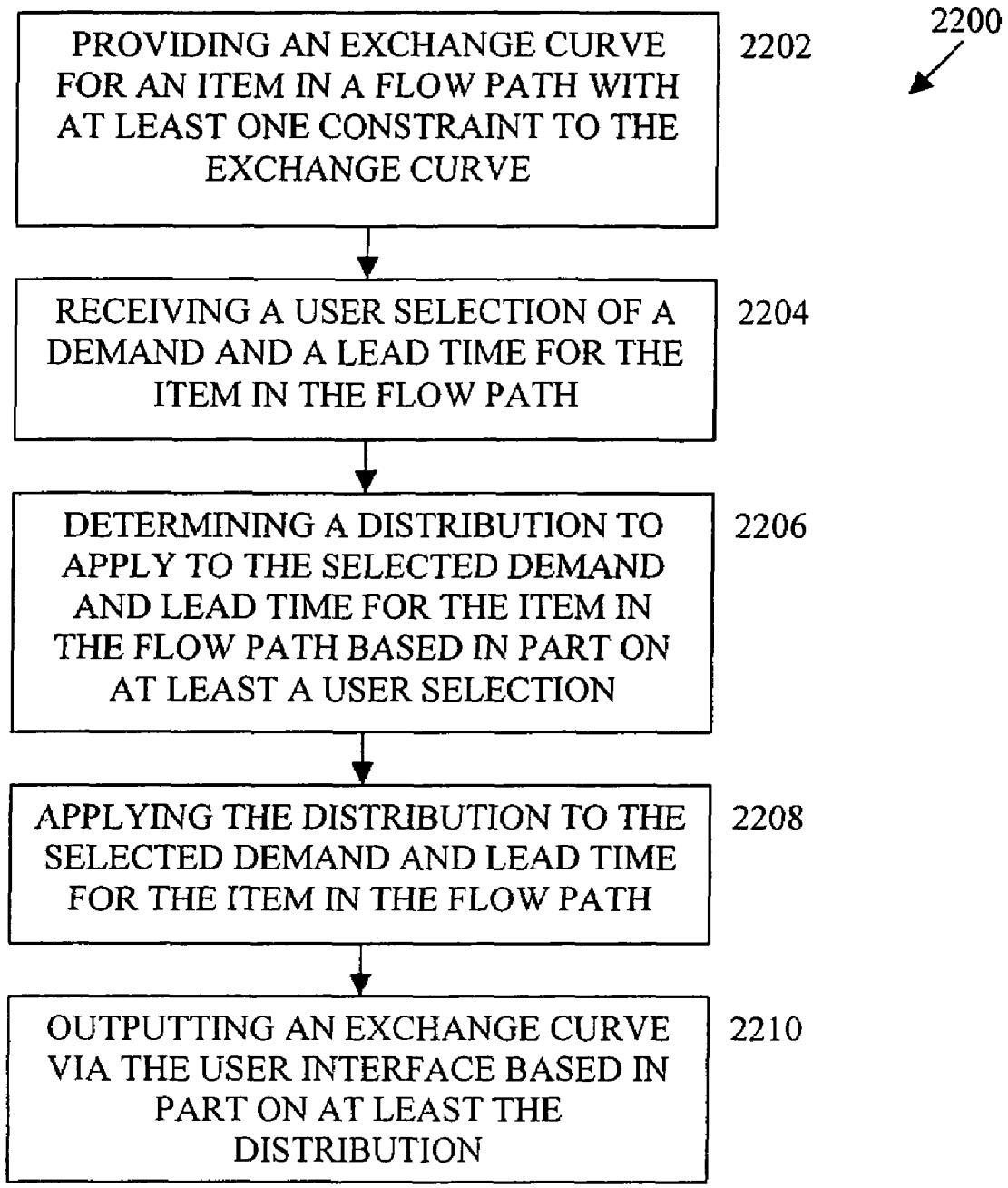
FIG. 22 illustrates a method according to various embodiments of the invention.

FIG. 22 illustrates a method for providing an exchange curve for an item in a flow path, wherein at least one constraint to the exchange curve can be represented. The method 2200 begins at block 2202.

In block 2202, a user interface capable of outputting an exchange curve is provided. In this example, an IA module such as 210 can provide a user interface capable of outputting an exchange curve.

Block 2202 is followed by block 2204, in which a user selection of a demand and a lead time for the item in the flow path is received. In this example, an IA module such as 210 can receive a user selection of a demand and a lead time for the item in the flow path.

Block 2204 is followed by block 2206, in which based in part on at least a user selection, a distribution to apply to the selected demand and lead time for the item in the flow path is determined. In this example, an IA module such as 210 can determine a distribution to apply to the selected demand and lead time for the item in the flow path.

Block 2206 is followed by block 2208, in which the distribution is applied to the selected demand and lead time for the item in the flow path. In this example, an IA module such as 210 can apply the distribution to the selected demand and lead time for the item in the flow path.

Block 2208 is followed by block 2210, in which based in part on at least the distribution, an exchange curve is output via the user interface. In this example, an IA module such as 210 can output an exchange curve via the user interface based in part on at least the distribution.

Figure 23:
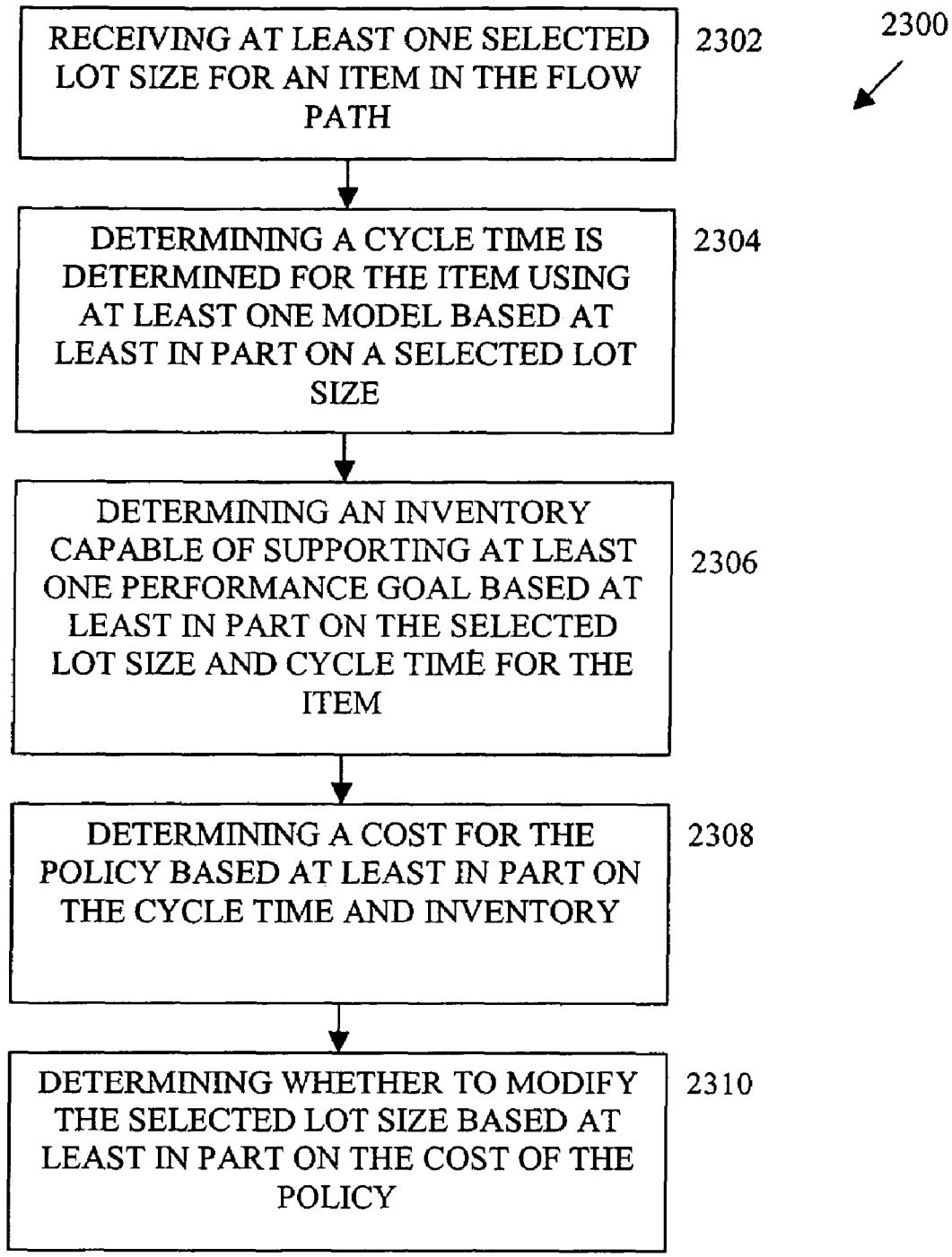
FIG. 23 illustrates a method according to various embodiments of the invention.

FIG. 23 illustrates a method for determining lot sizes for multiple items in a flow path. The method 2300 begins at block 2302.

At block 2302, at least one selected lot size is received for an item in the flow path. In this example, a lot sizer module such as 216 can receive at least one selected lot size for an item in the flow path.

Block 2302 is followed by block 2304, in which based at least in part on a selected lot size, a cycle time is determined for the item using at least one model. In this example, a WIP estimator module such as 216 can determine a cycle time for the item using at least one model based at least in part on a selected lot size.

Block 2304 is followed by block 2306, in which based at least in part on the selected lot size and cycle time for the item, an inventory capable of supporting at least one performance goal is determined. In this example, an IA module such as 210 can determine an inventory capable of supporting at least one performance goal, based at least in part on the selected lot size and cycle time for the item.

Block 2306 is followed by block 2308, in which based at least in part on the cycle time and inventory, a cost is determined for the policy. In this example, an IA module such as 210 can determine a cost for the policy based at least in part on the cycle time and inventory.

Block 2308 is followed by block 2310, in which based at least in part on the cost of the policy, a determination is made whether to modify the selected lot size. In this example, an IA module such as 210 can determine whether to modify the selected lot size based at least in part on the cost of the policy.

The method 2300 ends at block 2310.

Figure 24:
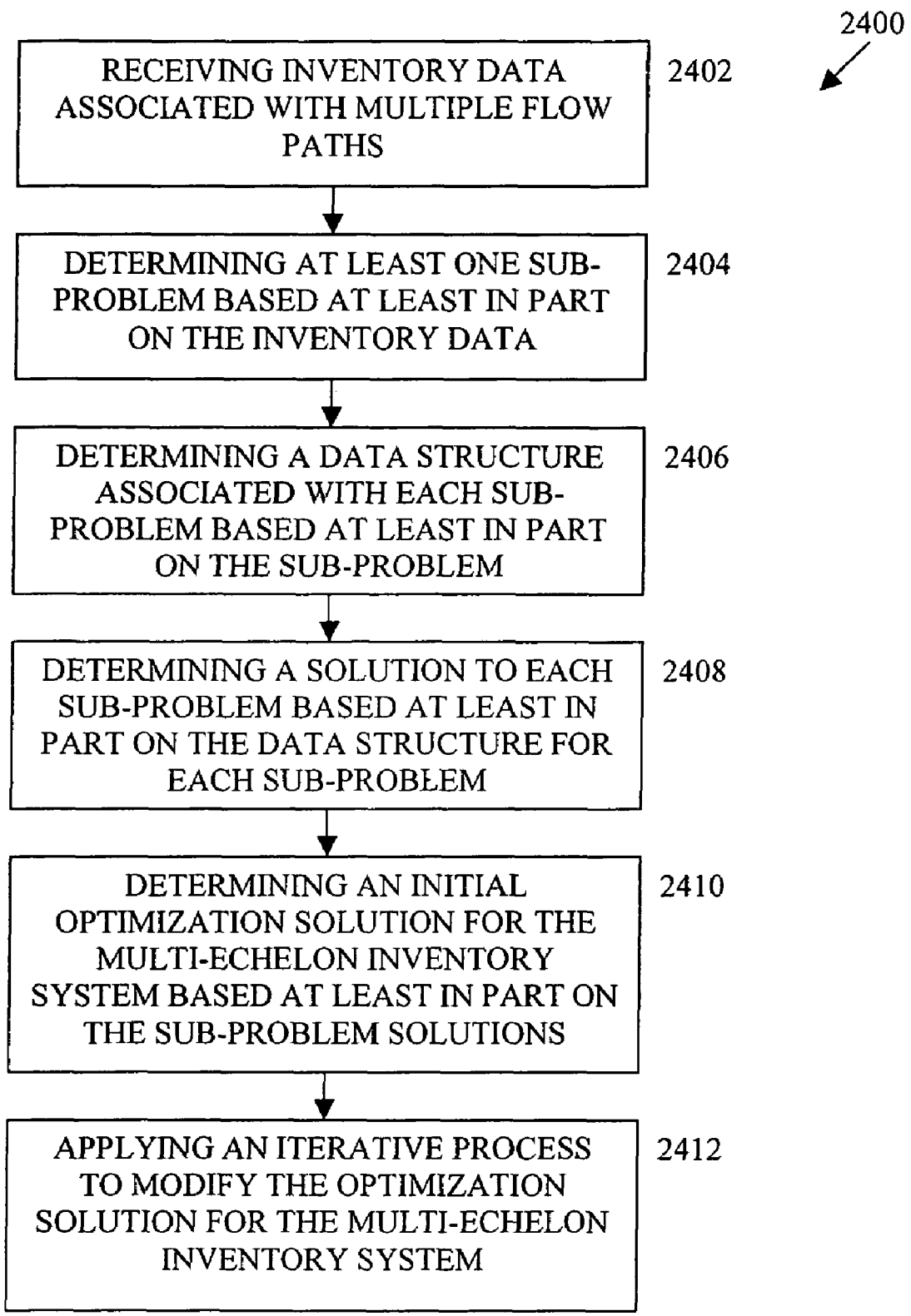
FIG. 24 illustrates a method according to various embodiments of the invention.

FIG. 24 illustrates a method for optimizing a multi-echelon inventory system, wherein the multi-echelon inventory system comprises multiple flow paths. The method 2400 begins at 2402.

In block 2402, inventory data associated with multiple flow paths is received. In this example, a MEIA module such as 210A can receive inventory data associated with multiple flow paths.

Block 2402 is followed by block 2404, in which based at least in part on the inventory data, at least one sub-problem is determined. In this example, a MEIA module such as 210A can determine at least one sub-problem based at least in part on the inventory data.

Block 2404 is followed by block 2406, in which based at least in part on the sub-problem, a data structure associated with each sub-problem is determined. In this example, a MEIA module such as 210A can determine a data structure associated with each sub-problem, based at least in part on the sub-problem.

Block 2406 is followed by block 2408, in which based at least in part on the data structure for each sub-problem, a solution to each sub-problem is determined. In this example, a MEIA module such as 210A can determine a solution to each sub-problem based at least in part on the data structure for each sub-problem.

Block 2408 is followed by block 2410, in which based at least in part on the sub-problem solutions, an initial optimization solution is determined for the multi-echelon inventory system. In this example, a MEIA module such as 210A can determine an initial optimization solution for the multi-echelon inventory system based at least in part on the sub-problem solutions.

Block 2410 is followed by block 2412, in which an iterative process is applied to modify the optimization solution for the multi-echelon inventory system. In this example, a MEIA module such as 210A can apply an iterative process to modify the optimization solution for the multi-echelon inventory system.

The method 2400 ends at block 2412.

Figure 25:
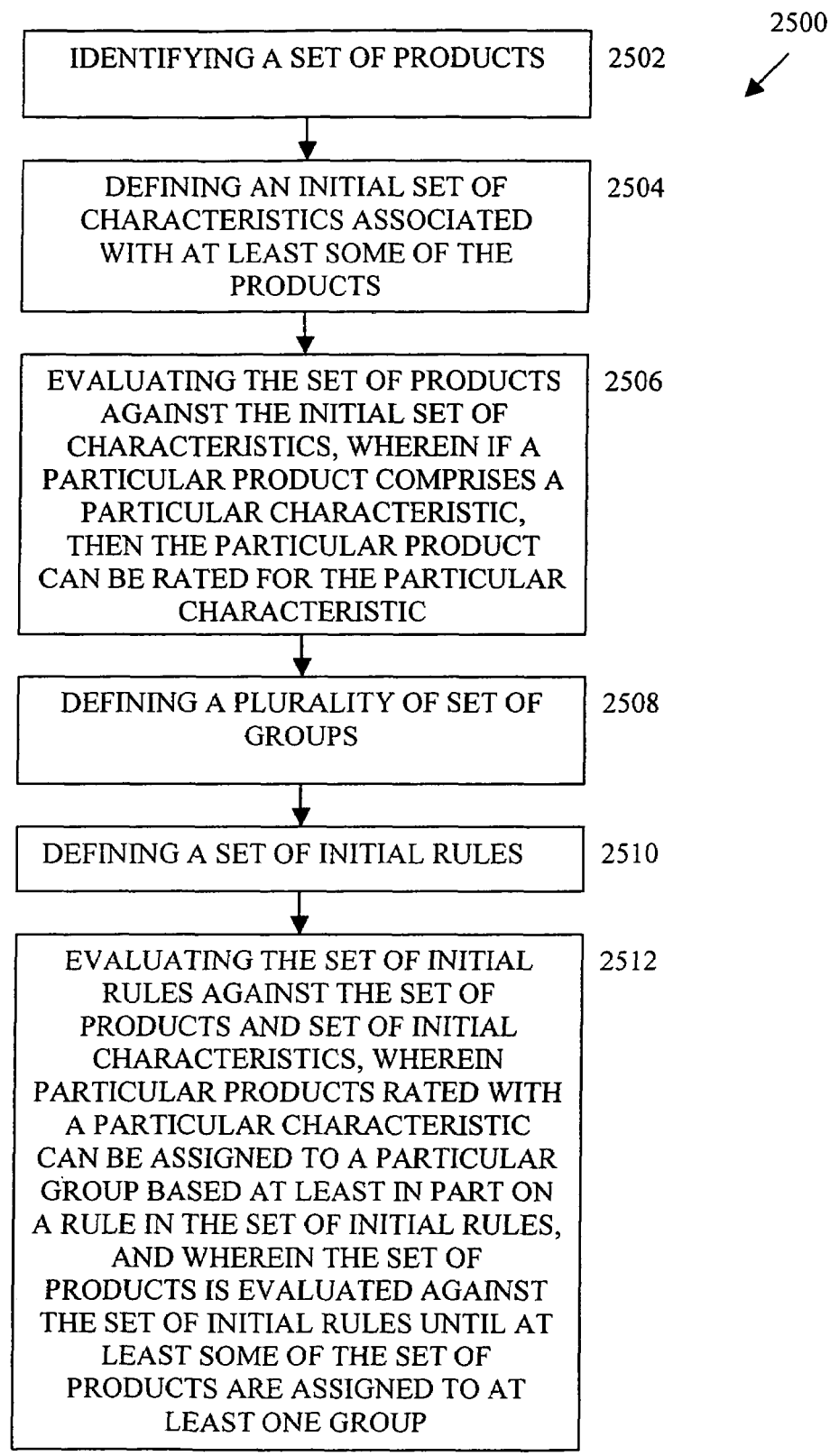
FIG. 25 illustrates a method according to various embodiments of the invention.

FIG. 25 illustrates a method for partitioning a plurality of products. The method 2500 begins at block 2502.

In block 2502, a set of products is identified. In this example, an IA module such as 210 can identify a set of products.

Block 2502 is followed by block 2504, in which an initial set of characteristics associated with at least some of the products is defined. In this example, an IA module such as 210 can define an initial set of characteristics associated with at least some of the products.

Block 2504 is followed by block 2506, in which the set of products is evaluated against the initial set of characteristics, wherein if a particular product comprises a particular characteristic, then the particular product can be rated for the particular characteristic. In this example, an IA module such as 210 can evaluate the set of products against the initial set of characteristics, wherein if a particular product comprises a particular characteristic, then the particular product can be rated for the particular characteristic.

Block 2506 is followed by block 2508, in which a plurality of set of groups is defined. In this example, an IA module such as 210 can define a plurality of set of groups.

Block 2508 is followed by block 2510, in which a set of initial rules is defined. In this example, an IA module such as 210 can define a set of initial rules.

Block 2510 is followed by block 2512, in which the set of initial rules is evaluated against the set of products and set of initial characteristics, wherein particular products rated with a particular characteristic can be assigned to a particular group based at least in part on a rule in the set of initial rules, and wherein the set of products is evaluated against the set of initial rules until at least some of the set of products are assigned to at least one group. In this example, an IA module such as 210 can evaluate the set of initial rules against the set of products and set of initial characteristics, wherein particular products rated with a particular characteristic can be assigned to a particular group based at least in part on a rule in the set of initial rules, and wherein the set of products is evaluated against the set of initial rules until at least some of the set of products are assigned to at least one group.

The method 2500 ends at block 2512.

The foregoing description of the preferred embodiments of the invention has been presented only for the purpose of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated.

The claimed invention is:

1. A method for controling the purchase, manufacture, or transfer of items employing a multi-echelon inventory system, wherein the multi-echelon inventory system comprises multiple flow paths, comprising:
   receiving inventory data of items associated with multiple flow paths on a computer server from a computerized relational database and/or a computer network;
   based at least in part on the inventory data, determining at least one sub-problem on the computer server, wherein the at least one sub-problem includes at least one customer and a plurality of suppliers, items or locations interconnected with each other;

based at least in part on the sub-problem, using the computer server to determine a data structure associated with each sub-problem;

based at least in part on the data structure for each sub-problem, determining a solution to each sub-problem on the computer server;

based at least in part on the sub-problem solutions, determining an initial solution for the multi-echelon inventory system on the computer server; and controlling the purchase, manufacture, or transfer of the items in accordance with the initial solution.

2. The method of claim 1, further comprising:

applying a computerized iterative process to modify the initial solution for the multi-echelon inventory system.

3. The method of claim 2, wherein the computerized iterative process comprises discrete event simulation.

4. The method of claim 1, further comprising:

providing a computer user interface capable of permitting a user to modify the initial solution.

* * * * *